(12) United States Patent
Yoshida et al.

(10) Patent No.: US 9,870,081 B2
(45) Date of Patent: Jan. 16, 2018

(54) DISPLAY DEVICE AND TOUCH-OPERATION PROCESSING METHOD

(71) Applicant: Sharp Kabushiki Kaisha, Osaka-shi, Osaka (JP)

(72) Inventors: Shigeto Yoshida, Osaka (JP); Masafumi Ueno, Osaka (JP); Tomohiro Kimura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 96 days.

(21) Appl. No.: 14/902,930

(22) PCT Filed: Mar. 14, 2014

(86) PCT No.: PCT/JP2014/056922
§ 371 (c)(1),
(2) Date: Jan. 5, 2016

(87) PCT Pub. No.: WO2015/025550
PCT Pub. Date: Feb. 26, 2015

(65) Prior Publication Data
US 2016/0154509 A1 Jun. 2, 2016

(30) Foreign Application Priority Data

Aug. 22, 2013 (JP) ................. 2013-172671

(51) Int. Cl.
*G06F 3/041* (2006.01)
*G06F 3/0484* (2013.01)
(Continued)

(52) U.S. Cl.
CPC .......... *G06F 3/0412* (2013.01); *G06F 1/1626* (2013.01); *G06F 1/1643* (2013.01);
(Continued)

(58) Field of Classification Search
None
See application file for complete search history.

(56) References Cited

U.S. PATENT DOCUMENTS

2013/0215060 A1    8/2013  Nakamura
2013/0271426 A1   10/2013  Yumoto et al.
(Continued)

FOREIGN PATENT DOCUMENTS

JP    2011-164676 A    8/2011
JP    2012-27581 A     2/2012
(Continued)

OTHER PUBLICATIONS

Official Communication issued in International Patent Application No. PCT/JP2014/056922 dated Jun. 17, 2014.

*Primary Examiner* — Jennifer Mehmood
*Assistant Examiner* — Carl Adams
(74) *Attorney, Agent, or Firm* — ScienBiziP, P.C.

(57) ABSTRACT

The operability is improved according to a use form without complicating a detection mechanism of a display device. A display device (1) according to the present invention includes: a use form determining unit (55) that determines a holding form based on a touch position of a touch operation for an end face (A or B) of a casing (17) and determines an attended area that is an area of the display area (P) attended by a user for a touch operation; and a display control unit (54) that changes a display mode of a screen to be displayed on the display area based on the holding form and the attended area.

10 Claims, 17 Drawing Sheets

(51) Int. Cl.
  *G06F 3/044* (2006.01)
  *G06F 1/16* (2006.01)
  *G06F 3/0488* (2013.01)
  *G06T 3/40* (2006.01)

(52) U.S. Cl.
  CPC ............ *G06F 1/1656* (2013.01); *G06F 3/044* (2013.01); *G06F 3/0416* (2013.01); *G06F 3/0484* (2013.01); *G06F 3/04845* (2013.01); *G06F 3/04886* (2013.01); *G06T 3/40* (2013.01); *G06F 2203/04104* (2013.01)

(56) References Cited

U.S. PATENT DOCUMENTS

2013/0342474 A1* 12/2013 Sultenfuss .............. G06F 3/041
                                                    345/173
2014/0062932 A1*  3/2014 Ebata ................. G06F 3/04886
                                                    345/173
2015/0123915 A1*  5/2015 Iwaizumi ............. G06F 3/0488
                                                    345/173

FOREIGN PATENT DOCUMENTS

JP       4955116 B1    6/2012
WO    2012/049942 A1   4/2012

* cited by examiner

FIG. 9
(a)
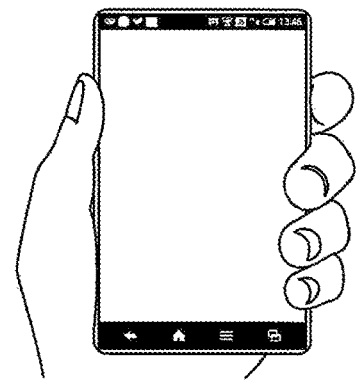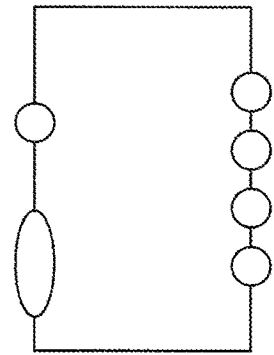
(b)
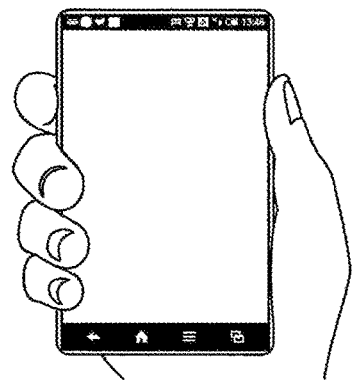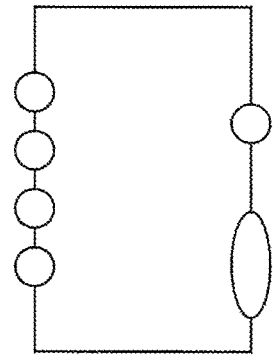
(c) (d)
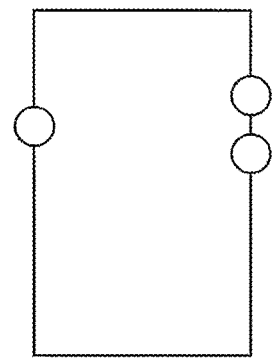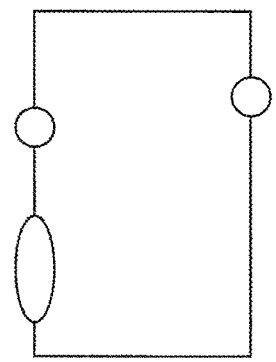

FIG. 11

| HOLDING FORM | ATTENDED AREA | LAYOUT |
|---|---|---|
| LEFT-HAND HOLDING | NEAR THUMB AREA | LAYOUT HAVING WIDE LEFT SIDE |
| | FAR THUMB AREA | LAYOUT HAVING WIDE RIGHT SIDE |
| | NO DEVIATION | NORMAL LAYOUT |
| RIGHT-HAND HOLDING | NEAR THUMB AREA | LAYOUT HAVING WIDE RIGHT SIDE |
| | FAR THUMB AREA | LAYOUT HAVING WIDE LEFT SIDE |
| | NO DEVIATION | NORMAL LAYOUT |

FIG. 12

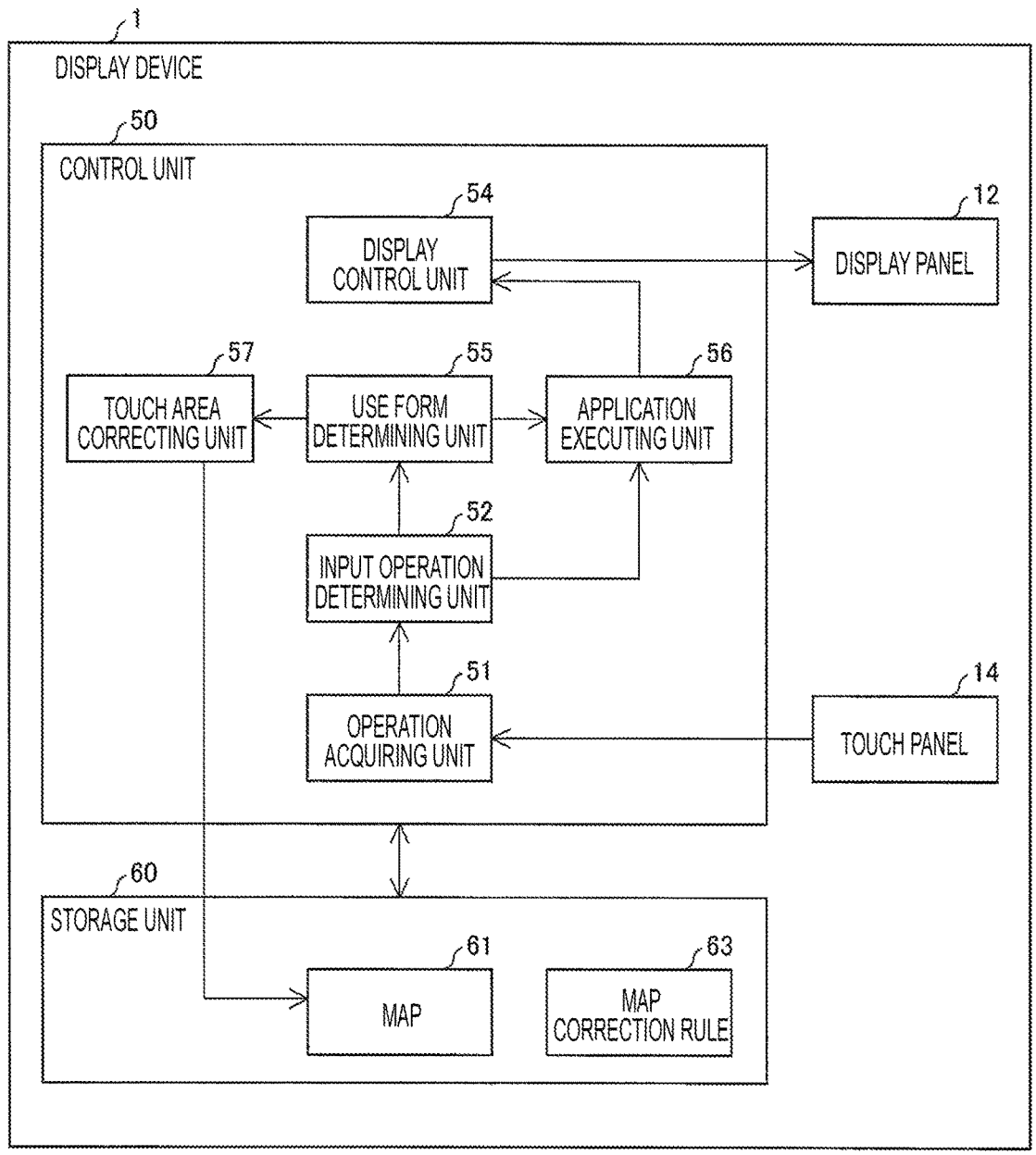

FIG. 18

| HOLDING FORM | ATTENDED AREA | MAP CORRECTION |
|---|---|---|
| LEFT-HAND HOLDING | NEAR THUMB AREA | CORRECT LEFT HALF OF TOUCHABLE AREA TO FURTHER RIGHT SIDE THAN VISIBLE AREA BY LARGE AMOUNT (CORRESPONDING TO TWO OFFSET VALUES) |
| | FAR THUMB AREA | CORRECT RIGHT HALF OF TOUCHABLE AREA TO FURTHER LEFT SIDE THAN VISIBLE AREA BY SMALL AMOUNT (CORRESPONDING TO ONE OFFSET VALUE) |
| | NO DEVIATION | NO CORRECTION (OFFSET VALUE 0) |
| RIGHT-HAND HOLDING | NEAR THUMB AREA | CORRECT RIGHT HALF OF TOUCHABLE AREA TO FURTHER LEFT SIDE THAN VISIBLE AREA BY LARGE AMOUNT (CORRESPONDING TO TWO OFFSET VALUES) |
| | FAR THUMB AREA | CORRECT LEFT HALF OF TOUCHABLE AREA TO FURTHER RIGHT SIDE THAN VISIBLE AREA BY SMALL AMOUNT (CORRESPONDING TO ONE OFFSET VALUE) |
| | NO DEVIATION | NO CORRECTION (OFFSET VALUE 0) |

DISPLAY DEVICE AND TOUCH-OPERATION PROCESSING METHOD

TECHNICAL FIELD

The present invention relates to a display device processing a touch operation and a touch-operation processing method.

BACKGROUND ART

In recent years, development of display devices each including a touch panel has progressed, and an example thereof includes Patent Literatures 1 and 2.

In Patent Literature 1, a display device has been disclosed which determines a user's holding hand holding the display device based on a detection result acquired by a first detection unit separately disposed in a part of the display device other than a display face and controls the display mode of an image displayed on the display face in accordance with the holding hand.

In Patent Literature 2, a mobile terminal and a key displaying method have been disclosed which optimize an input method by estimating a user's method of holding a terminal and a movable range of user's fingers by disposing sensors on the rear face and the side faces of a terminal casing and using information of the number of holding fingers, contact positions, and the like.

CITATION LIST

Patent Literatures

Patent Literature 1: JP 2011-164676 A (Published on Aug. 25, 2011)
Patent Literature 2: JP 2012-27581 A (Published on Feb. 9, 2012)
Patent Literature 3: Japanese Patent No. 4955116 (Registered on Mar. 23, 2012)

SUMMARY OF INVENTION

Technical Problem

However, in the conventional configuration described above, in the display device, in order to determine a holding form, separately from a sensor of a touch panel disposed on the display face (a keyboard arrangement face of a mobile terminal) of the display device, a dedicated sensor (a first detection unit disclosed in Patent Literature 1/a first sensor disclosed in Patent Literature 2) needs to be arranged. For this reason, the number of components mounted in the display device increases, a detection mechanism becomes complicated, and as a result, there is a problem that the processing load of the display device increases. In a case where the display device described above is applied to a mobile terminal which is particularly difficult to satisfy a request for thinning and lightening, the problem described above is particularly serious.

In a display device, in a case where an operation of a contact (or an approach) into apart other than the display face can be detected without complicating the detection mechanism, the use form (for example, a holding form) can be determined without causing an increase in the processing load. Then, by providing a large variety of user interfaces for a user in accordance with the use form, the operability can be improved.

The present invention is in consideration of the problems described above, and an object thereof is to realize a display device and a touch-operation processing method improving the operability by providing a user interface according to a use form without complicating a detection mechanism of the display device.

Solution to Problem

To solve the above problem, a display device according to an aspect of the present invention includes: a display member; an operation detecting member that is superimposed on the display member; a casing in which the display member and the operation detecting member are stored; the operation detecting member detecting a touch operation for a display area of the display member, and a part of the operation detecting member detecting a touch operation for an end face of the casing other than the display area, a use form determining unit that determines a holding form based on a touch position of the touch operation for the end face, which is detected by the operation detecting member and determines an attended area that is an area of the display area attended by a user for a touch operation; and a display control unit that changes a display mode of a screen to be displayed on the display member based on the holding form and the attended area determined by the use form determining unit.

To solve the above problem, a display device according to another aspect of the present invention includes: a display member; an operation detecting member that is superimposed on the display member; a casing in which the display member and the operation detecting member are stored; the operation detecting member detecting a touch operation for a display area of the display member, and a part of the operation detecting member detecting a touch operation for an end face of the casing other than the display area, a storage member that stores positions of touchable areas in which, for one or more objects included on a screen displayed on the display member, touch operations for the objects can be received; a use form determining unit that determines a holding form based on the touch position of the touch operation for the end face that is detected by the operation detecting member; and a touchable area correcting unit that corrects the positions of the touchable areas of the objects stored in the storage member based on the holding form determined by the use form determining unit.

To solve the above problem, a touch-operation processing method according to still another aspect of the present invention is executed by a display device including: a display member; an operation detecting member that is superimposed on the display member; and a casing in which the display member and the operation detecting member are stored, the operation detecting member detecting a touch operation for a display area of the display member, and a part of the operation detecting member detecting a touch operation for an end face of the casing other than the display area, the touch-operation processing method including: determining a holding form based on a touch position of the touch operation for the end face, which is detected by the operation detecting member, and determining an attended area of the display area that is an area of the display area attended by a user for the touch operation; and changing a display mode of a screen to be displayed on the display member based on the holding form and the attended area determined in the determining of a holding form and an attended area.

Advantageous Effects of Invention

According to one aspect of the present invention, an effect of improving the operability by providing a user interface according to a use form without complicating a detection mechanism of a display device is acquired.

BRIEF DESCRIPTION OF DRAWINGS

FIG. 6(a) is a diagram that illustrates the schematic configuration of a case where a cover glass is included, and FIG. 6(b) is a diagram that illustrates the schematic configuration of a case where a lens is included.

FIGS. 9(a) to 9(d) are diagrams that illustrate specific examples of holding forms determined by the display device and, more particularly, several examples of touch positions detected on an end face of a casing.

FIG. 11 is a diagram that illustrates an example of a layout determination rule stored in a storage unit of the display device according to the first embodiment.

FIGS. 12(a) to 12(c) are diagrams that illustrate specific examples of a layout defined in a layout determination rule.

FIG. 14 is a functional block diagram that illustrates the configuration of a main portion of a display device according to second and third embodiments of the present invention.

FIG. 15 is a diagram that illustrates an example of a map correction rule stored in a storage unit of the display device according to the second embodiment.

FIG. 18 is a diagram that illustrates an example of a map correction rule stored in a storage unit of the display device according to the third embodiment.

DESCRIPTION OF EMBODIMENTS

First, before detailed description of each embodiment of the present invention, the hardware configuration of a display device according to each embodiment of the present invention will be described.

[Schematic Configuration of Display Device]

First, the schematic configuration of the display device 1 will be described with reference to FIGS. 2 to 8(b). In the description presented below, while a case will be described in which the display device 1 is realized by a liquid crystal display, the display device is not limited thereto but may be configured by a plasma display, an organic EL display, a field emission display, or the like. In addition, while the display device 1 will be described as a plate-shaped member of which the face is rectangle, unless otherwise described, the display device is not limited thereto but may have a face having an oval shape, a circle shape, or the like and may have a shape having an uneven surface instead of the plate shape. In other words, the display device may have any shape, as long as a configuration capable of implementing functions described below is employed.

A case will be described with reference to FIGS. 2 and 3 in which the display device 1 functions as a mobile terminal. As examples of the mobile terminal to which the display device 1 according to the present invention is applied, there are a multi-function mobile phone (a so-called smartphone), a tablet, and the like.

Figure 2:
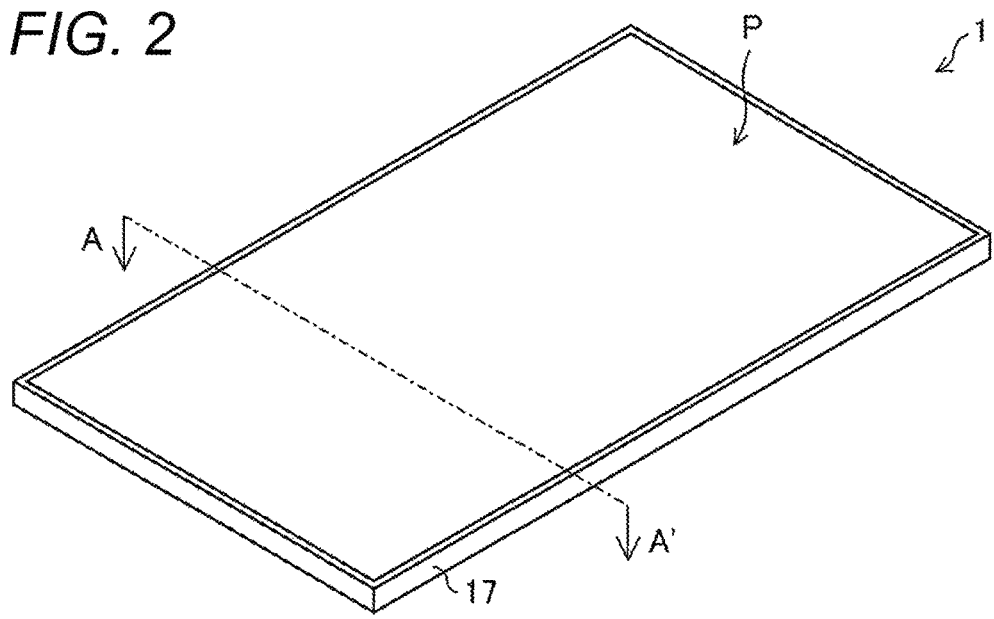
FIG. 2 is a perspective view that illustrates an example of a schematic configuration of a display device according to the present invention as a mobile terminal.

FIG. 2 is a perspective view that illustrates an example of a schematic configuration of the display device 1 as a mobile terminal. FIG. 3 illustrates an example of a schematic configuration of the display device 1 and is a cross-sectional view taken along line A-A' of the display device 1 illustrated in FIG. 2.

The display device 1 as the mobile terminal is a device capable of displaying an image and acquiring an input operation for the image. As illustrated in FIG. 2, the display device 1 has a shape defined by a casing 17, and an image is displayed inside a display area P of the display screen (display panel 12).

Figure 3:
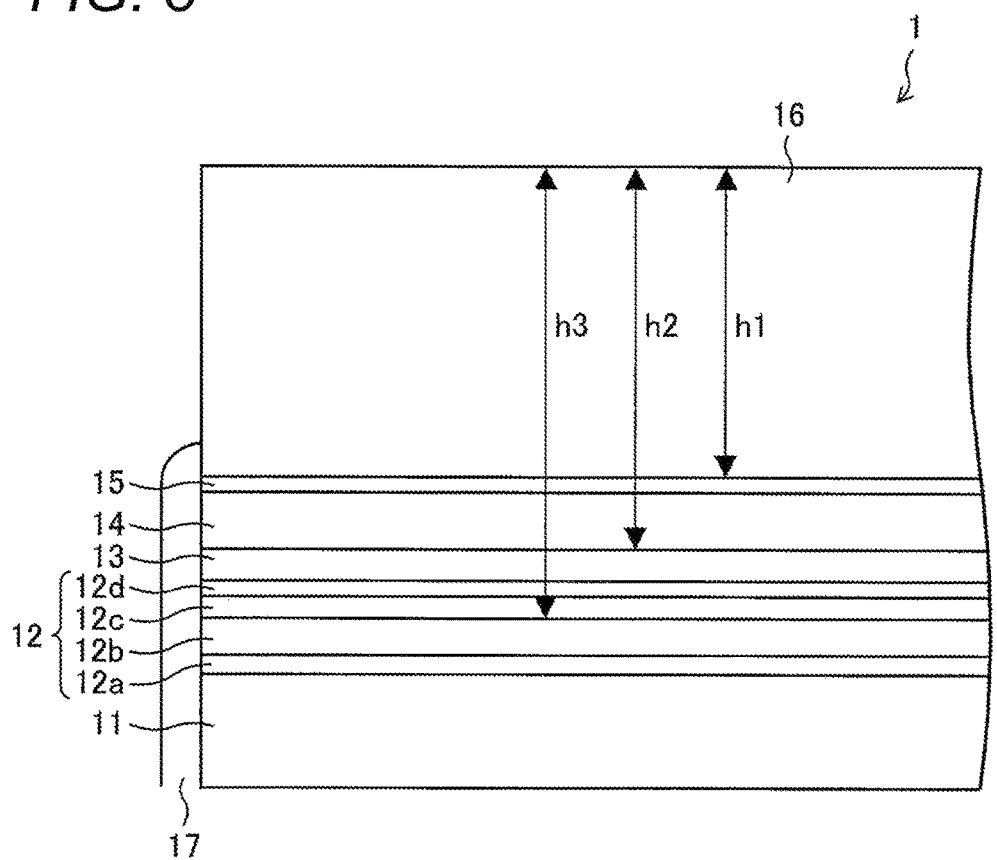
FIG. 3 is a cross-sectional view that illustrates an example of a schematic configuration of a display device according to the present invention.

More specifically, as illustrated in FIG. 3, the display device 1 is configured by stacking a display panel 12, a transparent adhesive layer (OCA) 13, a touch panel 14 (operation detecting member), a transparent adhesive layer 15, and a cover glass 16 on a backlight 11 in this order. Such members are supported by the casing 17 included in the display device 1. In other words, the casing 17 stores the display panel 12 and the touch panel 14.

The display panel 12 may employ a known configuration. For example, the display panel 12 is configured by: an active matrix substrate (not illustrated in the diagram) having an insulating property formed by using glass or the like; an opposing substrate (not illustrated in the diagram) that faces the active matrix substrate with a predetermined gap interposed therebetween and has light transmissivity formed by using glass or the like; and a liquid crystal layer interposed between the active matrix substrate and the opposing substrate. As the liquid crystal layer, any one of various types of liquid crystal layer may be used. For example, in the example illustrated in FIG. 3, two polarizing plates 12a and 12d arranged to have a TFT layer 12b including thin film transistors (TFT) interposed therebetween are arranged, and accordingly, a configuration capable of displaying gray scales of an image is formed. In addition, on the opposing substrate side, a color filter 12c is arranged, and accordingly, a configuration capable of color-displaying is formed.

On the display panel 12, data signal lines extending in the column direction, scan signal lines and capacitance wirings extending in the row direction, and pixels aligned in the row and column directions are disposed. Various signal lines are disposed on the active matrix substrate.

The structures of the pixels have the same configuration, and, in accordance with one pixel, at least one pixel electrode is disposed, and one data signal line, one scan signal line, and one capacitance wiring are disposed. In each pixel, on the active matrix substrate, the pixel electrode is connected to the data signal line through the thin film transistor arranged in the TFT layer 12b connected to the scan signal line, and liquid crystal capacitance is formed between the opposing electrode disposed in the opposing substrate and the pixel electrode.

The thin film transistor disposed in each pixel has a source electrode connected to a pixel electrode, a drain electrode connected to a data signal line, and a gate electrode connected to a scan signal line. Accordingly, the transistor is controlled to be turned on/off according to a scan signal (gate signal) supplied from the scan signal line, a voltage according to a data signal supplied to the data signal line is applied to the liquid crystal layer, and the voltage is configured to be maintained when the transistor is turned off.

The display panel 12 is controlled by various drive circuits and a display control circuit (none thereof is illustrated in the drawing) included in the display device 1. Examples of the various drive circuits include a data signal line driving circuit, a scan signal line driving circuit, and the like. By controlling the display panel 12 using such circuits, an image is displayed in the display area P.

The backlight 11 emits display light to be incident to the display panel 12. Here, the backlight 11 may be externally attached to the display device 1.

The touch panel 14 is superimposed on the display panel 12 and is a member that detects a contact or an approach of a target object such as a user's finger or an indication pen at least into the inside of the display area P of the display panel 12. Accordingly, a user's input operation for an image displayed in the display area P is acquired, and operations of predetermined functions (various applications) based on the input operation can be controlled. As the touch panel 14, for example, a touch panel of an electrostatic capacity type may be employed.

Between the display panel 12 and the touch panel 14, the transparent adhesive layer 13 is disposed, and the display panel 12 and the touch panel 14 are fixed. Instead of this transparent adhesive layer 13, an air layer (air gap) may be arranged. However, in the display device 1 according to each embodiment, it is preferable to arrange the transparent adhesive layer 13. As illustrated in FIG. 3, by arranging the transparent adhesive layer 13, the optical characteristics of the display device 1 can be improved, and the film thickness (gap) controllability of each layer can be improved.

The transparent adhesive layer 15 is disposed between the touch panel 14 and the cover glass 16 and fixes the touch panel 14 and the cover glass 16.

The cover glass 16 is a plate-shaped member having transparency and is arranged to cover the touch panel 14 so as to protect the touch panel from 14 from external factors. Here, while a case is assumed in which the shape of the cover glass 16 is a rectangular shape, the shape is not limited thereto but may have a notched shape in the end portion (outer edge) thereof. In such a case, since a distance from the outer edge of the cover glass 16 to an outer-edge electrode group (an electrode group (see FIGS. 6(a) and 6(b)) configured by a detection electrode 31a and a drive electrode 32a) of the touch panel 14 can be shortened, the detection accuracy on the outer surface A (the outer surface A (see FIGS. 6(a) and 6(b)) of the display device 1 other than the display area P) of the display device 1 can be improved.

The casing 17, as described above, stores the display panel 12 and the touch panel 14. A material having a high dielectric constant is used for the casing 17. Here, the "material having a high dielectric constant" represents a material having a dielectric constant of a degree for which a contact or an approach of a finger or the like into the outer edge of the display device 1 can be easily detected by the touch panel 14. More specifically, as the material used for the casing 17, it is preferable to use a material having a dielectric constant of the degree for which the detection can be easily made, in other words, a dielectric constant of three or more (preferably, six or more). By using a material having such a high dielectric constant for the casing 17, the detection accuracy on the outer edge of the display device 1 can be improved.

The thickness of each member of the display device 1 as the mobile terminal according to each embodiment, for example, is as follows.

The thickness of the backlight 11 is 0.74 mm, the thickness of the polarizing plate 12a is 0.15 mm, the thickness of the TFT layer 12b is 0.25 mm, the thickness of the color filter 12c is 0.15 mm, the thickness of the polarizing plate 12d is 0.11 mm, the thickness of the transparent adhesive layer 13 is 0.2 mm, the thickness of the touch panel 14 is 0.4 mm, the thickness of the transparent adhesive layer 15 is 0.1 mm, and the thickness h1 of the cover glass 16 is 2 mm. In addition, a thickness h2 from the surface of the cover glass 16 to an interface between the touch panel 14 and the transparent adhesive layer 13 is 2.5 mm, and a thickness h3 from the surface of the cover glass 16 to an interface between the color filter 12c and the TFT layer 12b is 2.96 mm.

It is apparent that the thicknesses described above represent an example, and the thicknesses are appropriately changed according to the size and the like of a mobile terminal including the display device 1. In addition, the horizontal length (width) of the casing 17, as will be described later, is set to be a length in which a contact or an approach of a finger or the like into the outer surface (end face) of the casing 17 can be detected by the touch panel 14 or less.

Modified Example

Figure 4:
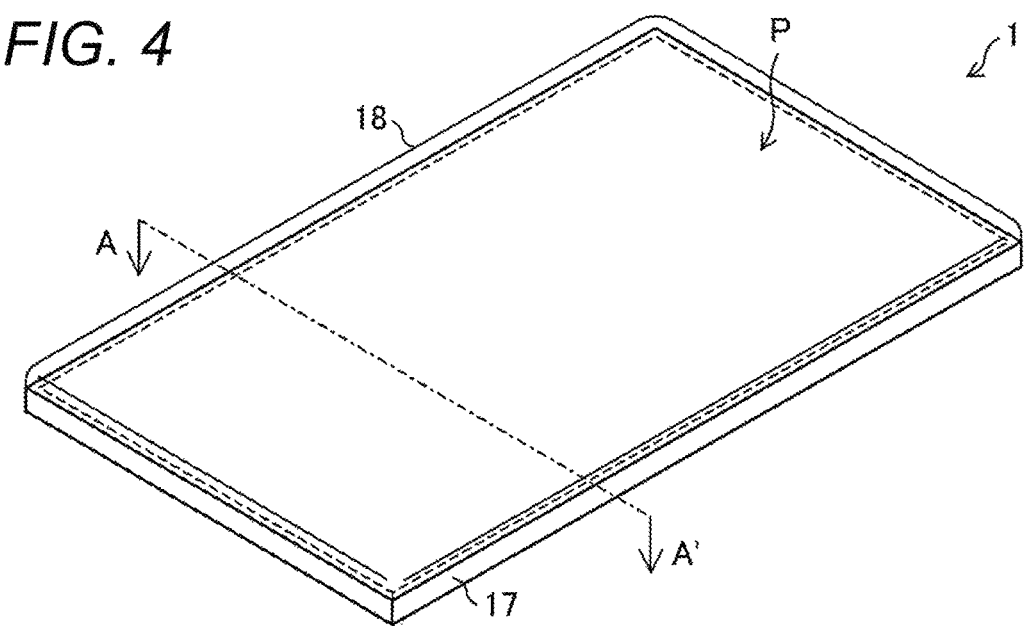
FIG. 4 is a perspective view that illustrates another example of the schematic configuration of a display device according to the present invention as a mobile terminal.
Figure 5:
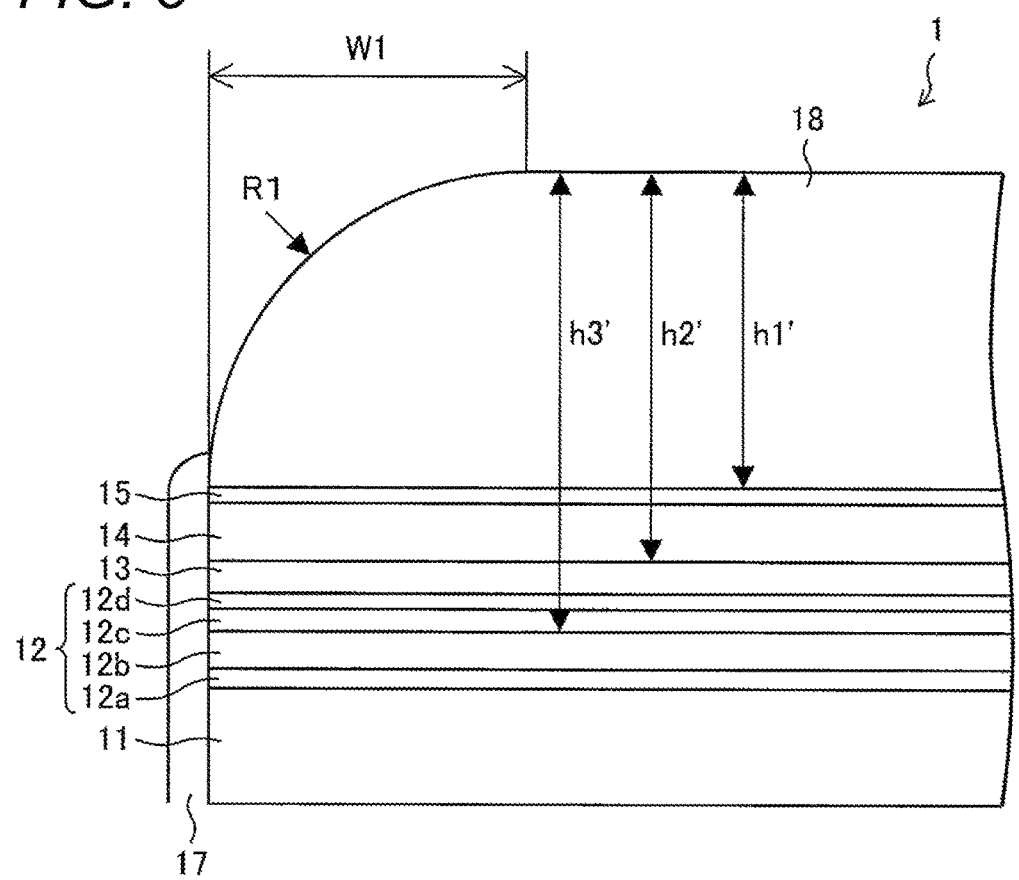
FIG. 5 is a cross-sectional view that illustrates another example of the schematic configuration of a display device according to the present invention.

A modified example of the display device 1 will be described with reference to FIGS. 4 and 5. FIG. 4 is a perspective view that illustrates another example of the schematic configuration of the display device 1 as the mobile terminal. FIG. 5 illustrates an example of the schematic configuration of the display device 1 and is a schematic cross-sectional view of the display device 1 illustrated in FIG. 4 taken along line A-A'.

The display device 1 according to the modified example, as illustrated in FIGS. 4 and 5, includes a lens 18 instead of the cover glass 16, which is different from the display device 1 illustrated in FIGS. 2 and 3. However, the functions of the other members such as the display panel 12 and the touch panel 14 are the same as those of the members of the display device 1. Thus, mainly, parts different from those of the display device 1 will be described, and description of the others will not be presented.

As illustrated in FIG. 5, the lens 18 is stacked on the touch panel 14 of the display device 1. This lens 18 is a plate-shaped member having transparency and is arranged to cover the touch panel 14 so as to protect the touch panel 14 from external factors. The lens 18 has a notched portion R1 (notched shape) in the end portion (outer edge) thereof and changes the traveling direction of light exiting from the display panel 12.

By arranging the lens 18 including the notched portion R1, the detection accuracy of the touch panel 14 on the outer edge of the display device 1 can be improved. The traveling direction of light emitted from a pixel arranged on the outer edge of the display panel 12 is changed by the notched portion R1 and exits from an area (non-display area) disposed on the outer side of the pixel. Accordingly, the viewing angle (a display area when seen from a user) of an image can be enlarged. In a case the enlargement function is not necessary, the notched portion R1 does not necessarily need to be included.

Regarding the thickness of each member of the display device 1 based on this modified example, the thickness of each member other than the cover glass 16 is the same as that of the display device 1 illustrated in FIGS. 2 and 3. In the display device 1 illustrated in FIGS. 4 and 5, the thickness h1' of the lens 18 is 2.13 mm, a thickness h2' from the surface of the lens 18 to an interface between the touch panel 14 and the transparent adhesive layer 13 is 2.63 mm, and a thickness h3' from the surface of the lens 18 to an interface between the color filter 12c and the TFT layer 12b is 3.09 mm. The width w1 of the notched portion R1 is 2.1 mm. Such thicknesses are merely an example and are appropriately changed according to the size and the like of a mobile terminal including the display device 1.

[Specific Configuration of Display Device]

Next, a specific configuration of the display device 1 will be described with reference to FIGS. 6(a) and 6(b). FIGS. 6(a) and 6(b) are cross-sectional views illustrating examples of the specific configuration of the display device 1 according to the present invention, FIG. 6(a) is a diagram that illustrates the specific configuration of the display device 1 including the cover glass 16, and FIG. 6(b) is a diagram that illustrates the specific configuration of the display device 1 including the lens 18 according to the modified example.

Here, for the simplification of the description, the configuration of the transparent adhesive layer 15 and the like illustrated in FIGS. 3 and 5 are not illustrated.

Hereinafter, an operation of causing a target object such as a finger, a touch pen, or the like to be in contact with or approach the display area or the end face regardless of user's intention will be collectively referred to as a touch operation.

As illustrated in FIG. 6(a), the touch panel 14 includes detection electrodes 31 and drive electrodes 32 as an electrode group used for detecting a touch operation using the target object on the substrate. In addition, detection electrodes 31a and drive electrodes 32a included in the electrode group are included as an outer-edge electrode group arranged along the outer edge of the touch panel 14 (in other words, the substrate described above).

As illustrated in FIG. 6(a), between the display panel 12 and the inner surface of the casing 17, a first wiring storing portion 12A, in which various wirings of the display panel 12 can be arranged, is included, and, between the touch panel 14 and the casing 17, a second wiring storing portion 14A, in which various wirings of the touch panel 14 are arranged, is included.

A shortest distance d between the touch panel 14 and the end face (the outer surface A illustrated in FIG. 6(a)) of the casing 17 other than the display area P is a detectable distance, in which a touch operation for the outer surface A can be detected by the touch panel 14, or less. According to such a configuration, a touch operation for the end face (the outer surface A) of the casing 17 other than the display area P can be detected.

According to the configuration described above, the touch panel 14 detecting a touch operation for the display area P can detect a touch operation for the outer surface A, and thus, a detection member (dedicated sensor) used for detecting a target object such as a finger for the outer surface A does not additionally need to be arranged. Accordingly, a touch operation for the end face can be detected without increasing the number of components of the display device 1 (without complicating the detection mechanism).

This shortest distance d, as illustrated more specifically in FIG. 6(a), is a first distance between each of the detection electrode 31a and the drive electrode 32a as the outer-edge electrode group included in the touch panel 14 and the outer surface A. It is preferable that this first distance (shortest distance d) is a second distance d1, which is a distance between the touch panel 14 (more specifically, the detection electrode 31 and the drive electrode 32) and the outer surface (a contact face of a finger or the like and the top face of the display device 1) of the cover glass 16, or less in the vertical direction of the display panel 12. In the case of such a configuration, a touch operation for the outer surface A of the casing 17 can be reliably detected.

As described above, the display device 1 has a configuration for achieving a thin frame (frameless) in which the shortest distance d is defined such that a contact or an approach of a finger or the like into the outer surface A of the casing 17 can be detected. In this way, a touch operation for the end face of the casing 17 can be sensed. In addition, by achieving a thin frame, the design of the display device 1 can be improved.

Modified Example

Figure 6:
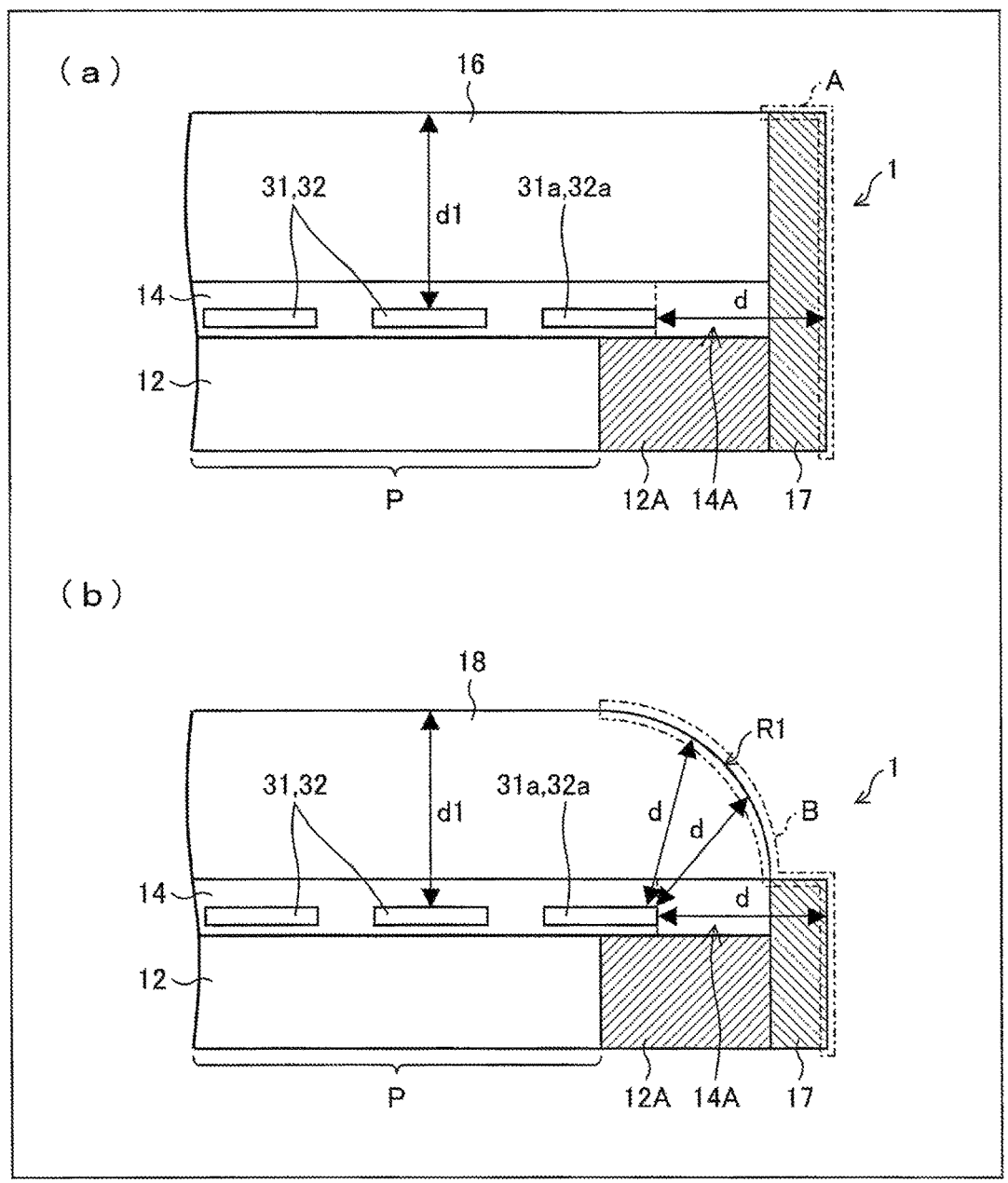
FIGS. 6(a) and 6(b) are cross-sectional views that illustrate examples of the schematic configurations of a display device according to the present invention.

In the display device 1 based on the modified example, as illustrated in FIG. 6(b), a shortest distance d between the touch panel 14 and the end face (here, the outer surface B) of the casing 17 other than the display area P is a detectable distance, in which a touch operation for the outer surface B can be detected by the touch panel 14, or less. Here, the outer surface B includes two outer surfaces, in other words, an outer surface of the notched portion R1 of the lens 18 in addition to the outer surface (the outer surface A illustrated in FIG. 6(*a*)) of the casing 17.

In this modified example, as illustrated in FIG. 6(*b*), the shortest distance d (first distance) is a distance between each of the detection electrode 31*a* and the drive electrode 32*a* as the outer-edge electrode group included in the touch panel 14 and the outer surface B. It is preferable that this shortest distance d is the second distance d1 or less, and the shortest distance d may be the detectable distance or less on at least one end face that is a part of the outer surface B.

(Structure of Touch Panel)

Figure 7:
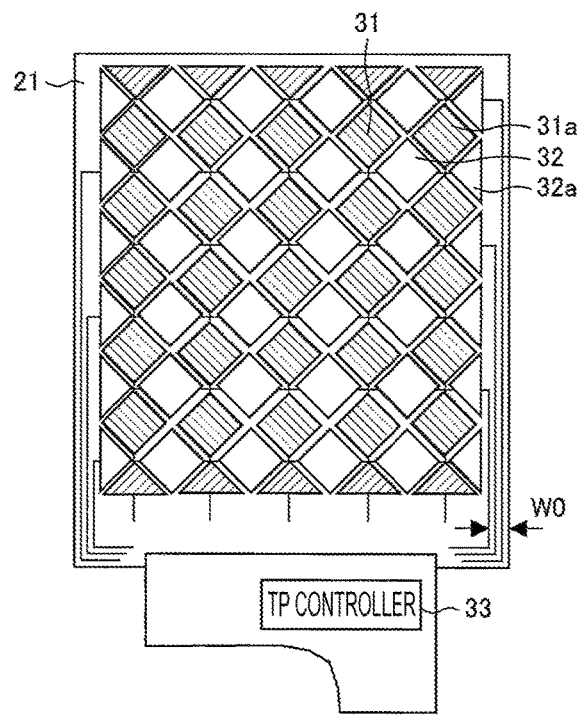
FIG. 7 is a schematic top view that illustrates an example of a touch panel included in a display device according to the present invention.

FIG. 7 is a top view that illustrates the schematic configuration of the touch panel 14. As illustrated in the drawing, the touch panel 14 includes detection electrodes 31 and drive electrodes 32 as an electrode group used for detecting a touch operation on a substrate 21 in a matrix pattern. In addition, detection electrodes 31*a* and drive electrodes 32*a* included in the electrode group are included as an outer-edge electrode group arranged along the outer edge of the touch panel 14 (in other words, the substrate 21). The detection electrodes 31 and the drive electrodes 32 are controlled by a TP controller (touch panel controller) 33.

The display device 1 is configured to detect a touch operation for the end face (the outer surface A or B illustrated in FIGS. 6(*a*) and 6(*b*)) of the casing 17. For this reason, in the case of the display device 1 including the cover glass 16, it is preferable that the second wiring storing portion 14A (a frame wiring width w0 of the touch panel 14) of the touch panel 14 illustrated in FIG. 6(*a*) is 1 mm or less. In addition, in the case of the display device 1 including the lens 18, it is preferable that the electrodes and the second wiring storing portion 14A are arranged so as not to disturb the optical path of light exiting from the display panel 12.

(Detection in Depth Direction)

Figure 8:
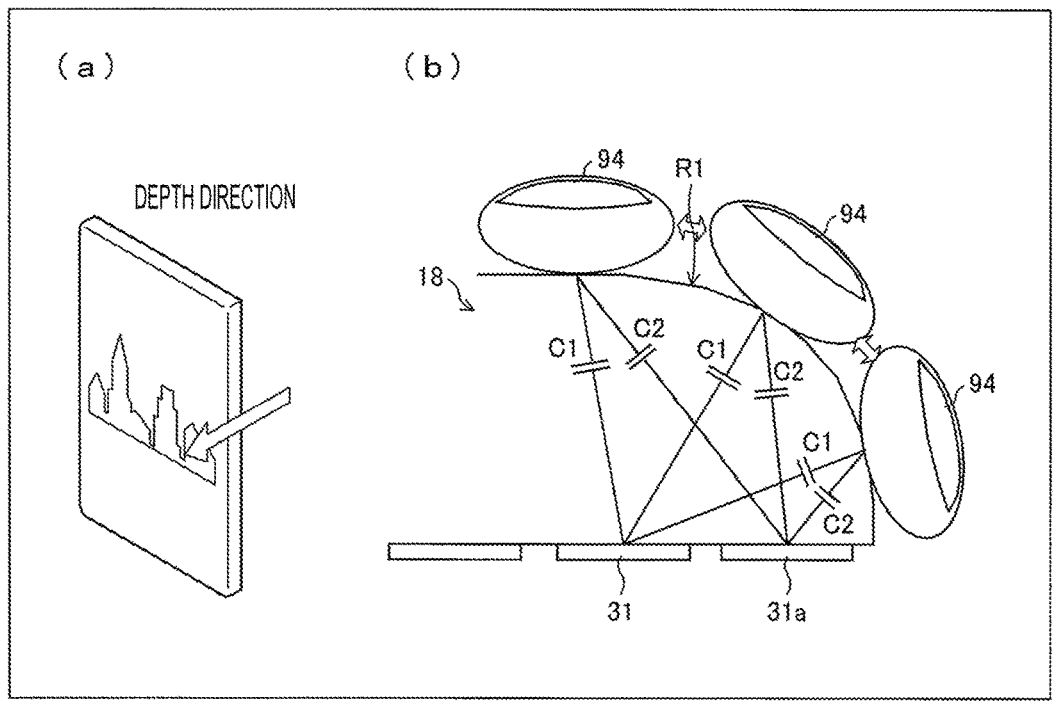
FIGS. 8(a) and 8(b) are diagrams that illustrate a method of detecting an input operation in the depth direction.

FIGS. 8(*a*) and 8(*b*) are diagrams that illustrate a method of detecting an input operation in the depth direction. In order to detect an input operation in the depth direction, it is preferable that the cover glass 16 and the lens 18 have a notched shape. Hereinafter, the display device 1 including the lens 18 that has a notched portion R1 will be used for description.

As illustrated in FIG. 8(*a*), in a case where an input operation in the depth direction of the display device 1 is present, more specifically, as illustrated in FIG. 8(*b*), a finger 94 moves so as to at least follow the notched portion R1 (a part of the outer surface B) of the lens 18. In such a case, the TP controller 33 (see FIG. 7) receives signals (electrostatic capacitance C1 and C2) from the detection electrode 31 and the detection electrode 31*a* that are adjacent to each other at the position of each finger 94 and calculates a difference (C1-C2) between the signals, thereby capable of detecting movement in the depth direction.

For the calculation of the difference, in other words, the control of reading a difference between detection electrodes adjacent to each other, a known configuration may be employed. Examples thereof are disclosed in Patent Literature 3 and the like. Thus, detailed description thereof will not be presented here.

As described above, according to the above-described configuration of the display device 1 of the present invention, the detection electrode 31*a* and the drive electrode 32*a* arranged at positions close to the end face of the casing 17 function as electrodes detecting a touch operation for a corresponding display area and also function as the outer-edge electrode group detecting a touch operation for the end face.

In this way, even in a case where an additional detection electrode used for detecting a touch operation for an end face is not arranged, instead of (or in addition to) detecting a touch operation for the display area, a touch operation for the end face (for example, the outer surface A or B) of the casing 17 of the display device 1 can be detected.

For example, in a case where a touch operation for the end face is received instead of receiving a touch operation executed on an image (on the display area) displayed on the display panel 12, the user does not need to touch a spot on the display area, and accordingly, a user's touch operation can be acquired while preventing the visibility of the image and the operability from being degraded. Alternatively, in a case where a touch operation for the end face is received in addition to the receiving of a touch operation executed on the display area, a large variety of user interfaces can be realized in the display device 1 (mobile terminal) in accordance with a combination of touch operations.

Hereinafter, the content of the operation of the display device 1 according to the present invention receiving touch operations for both the end face and the display area will be described in detail for each embodiment.

First Embodiment

Problem to be Solved by Invention

Figure 10:
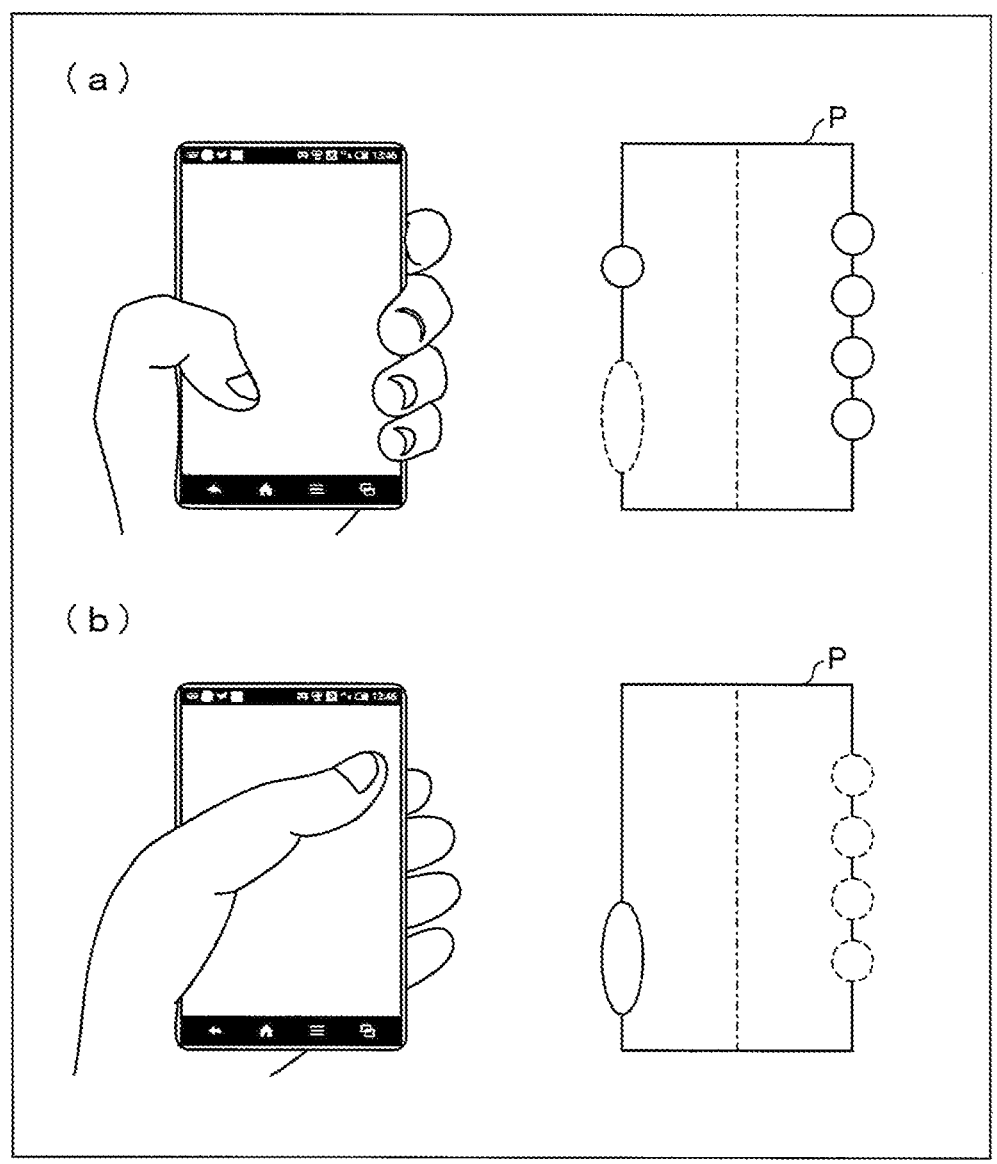
FIGS. 10(a) and 10(b) are diagrams that illustrate specific examples of an attended area determined by the display device and, more particularly, several examples of touch positions detected on an end face of the casing.

When a user executes a touch operation for a touch panel of a display device, there is a problem in that there is a variation in the degree of easiness/difficulty in the touch operation based on the position of a finger executing the touch operation and a position on the display area desired to be touched. Particularly, in a case where the user executes the touch operation using one hand, such a variation becomes remarkable. For example, as illustrated in FIGS. 10(*a*) and 10(*b*), in a case where the display device is held using the left hand, and a touch operation is executed using the thumb of the left hand, it is difficult to execute the operation in a case where a spot is located too far from the thumb, and, to the contrary, it is difficult to execute the operation in a case where the spot is too close to the thumb. A variation in the operability occurring in the display area in this way is not resolved by only determining the holding form as in the technologies disclosed in Patent Literatures 1 and 2.

In the first embodiment, a display device according to the present invention capable of improving the operability by resolving a variation in the operability occurring in the display area will be described in detail.

The first embodiment of the present invention will be described as below with reference to FIGS. 1 to 13.

[Functional Configuration of Display Device 1]

Figure 1:
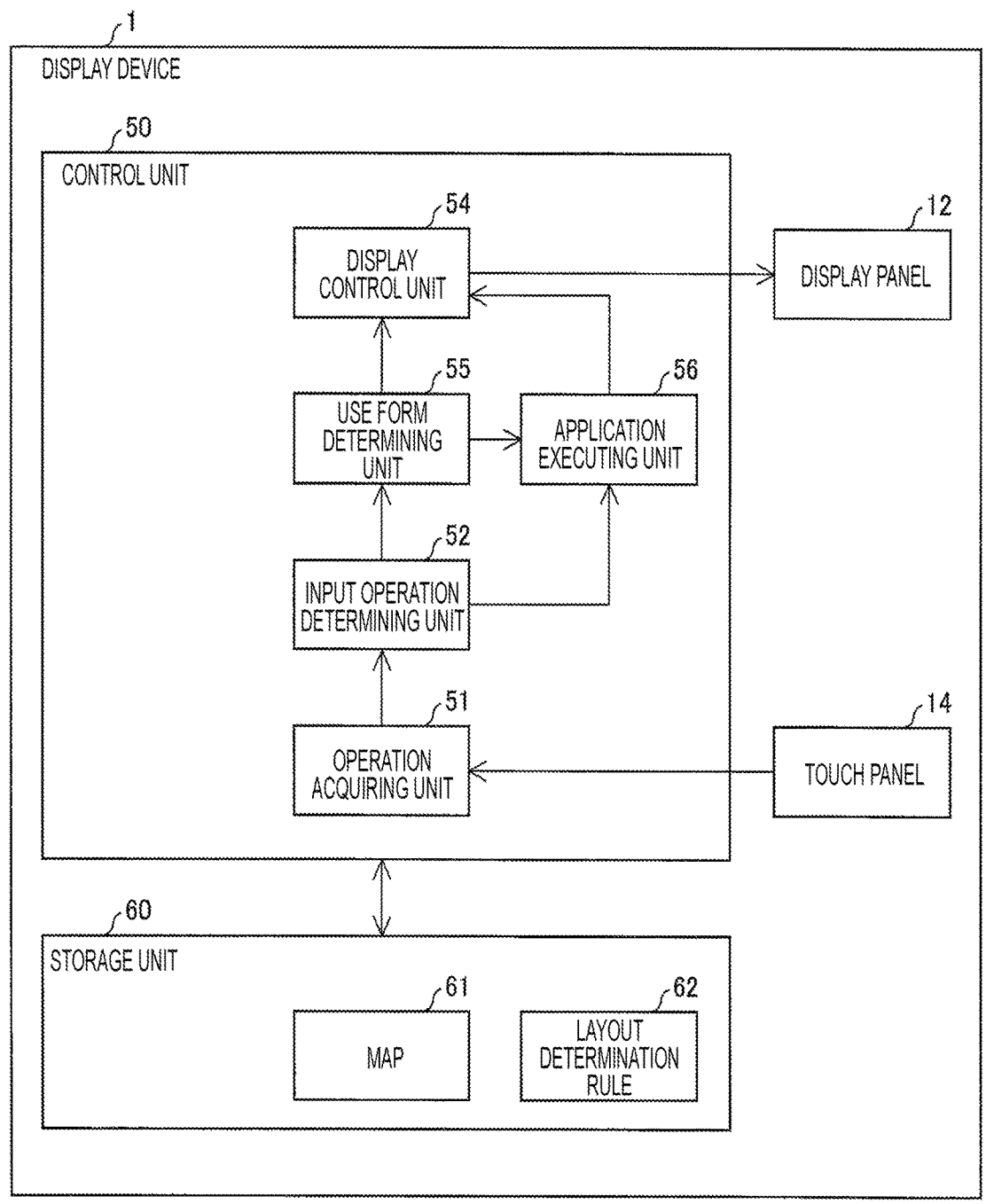
FIG. 1 is a functional block diagram that illustrates the configuration of a main portion of a display device according to a first embodiment of the present invention.

FIG. 1 is a functional block diagram that illustrates the configuration of a main portion of the display device 1. The control unit 50 of the display device 1 will be described with the process, which is executed when the display device 1 acquires a touch operation (particularly, an input operation for the end face (the outer surface A or B) of the display device 1), being mainly focused on.

As illustrated in FIG. 1, the display device 1, mainly, includes: a display panel 12; a touch panel 14; a control unit 50; and a storage unit 60. Additionally, while the display device 1 as a mobile terminal (for example, a smartphone) has general functions of a smartphone, parts thereof not directly relating to the present invention will not be described. The touch panel 14 and the display panel 12 are as described above. Hereinafter, the control unit 50 will be described. Here, the configuration of the control unit 50 is merely an example, and the control unit 50 is not limited thereto.

The control unit 50 integrally controls each unit of the display device 1 and includes: an operation acquiring unit 51; an input operation determining unit 52; a use form determining unit 55; and a display control unit 54 as functional blocks. In addition, the control unit 50 may include an application executing unit 56 that executes various applications installed to the display device 1. Each unit represented as the functional block can be realized as an operation processing device such as a CPU (central processing unit) reads a program stored in a storage device (here, the storage unit 60) such as ROM (read only memory) into a temporary storage unit (not illustrated in the drawing) such as RAM (random access memory) and executes the program.

The operation acquiring unit 51 acquires a touch operation of a target object for the display area P (see FIG. 2) of the display device 1 and the end face of the display device 1. The acquisition of a touch operation using the operation acquiring unit 51 is executed by receiving a detection signal from the TP controller 33. More specifically, the TP controller 33 detects the position of the detection electrode 31 or 31a at which a change in the capacitance occurs and transmits a result of the detection to the operation acquiring unit 51 as the detection signal described above.

The input operation determining unit 52 determines the position at which the touch operation is executed (hereinafter, referred to as a touch position) and the type of the executed touch operation based on the detection signal acquired by the operation acquiring unit 51. The input operation determining unit 52 transmits a result of the determination, in other words, touch operation information including information of coordinates of the touch position and the type (a tap, a double tap, a flick, a drag, pinch in, pinch out, or the like) of the touch operation to a downstream functional block. More specifically, in a case where the detection signal acquired by the operation acquiring unit 51 is based on a change in the capacitance of the detection electrode 31a as the outer-edge electrode group, the input operation determining unit 52 transmits the touch operation information not only to the application executing unit 56 but also to the use form determining unit 55. On the other hand, in a case where the acquired detection signal is based on a change in the capacitance of the detection electrode 31, the touch operation information is transmitted to the application executing unit 56 and the like. The control unit 50, in addition to the application executing unit 56, may include a process executing unit not illustrated in the drawing. In such a case, in a case where the process executing unit executes a certain process according to a touch operation, the input operation determining unit 52 may transmit the touch operation information to the process executing unit.

The use form determining unit 55 determines a user's use form of the display device 1 in accordance with the touch position of the target object on the end face of the display device 1.

More specifically, the use form determining unit 55 determines a holding form in accordance with a touch position on the end face at which the touch operation is executed. The holding form is information representing a user's hand holding the display device 1, and the determining of a holding form is determining whether the user uses the display device 1 with holding it either using the right hand or using the left hand.

In this embodiment, the use form determining unit 55 determines an attended area in accordance with a touch position of a target object on the end face. The attended area represents a part area (an area to be operated using a finger or the like and the periphery thereof), to which the user attends during the use of the display device 1, of the display area P. In this embodiment, as an example, part areas acquired by horizontally dividing the display area P into two parts having an equal area are defined in advance. The use form determining unit 55 determines whether an attended area to be operated by the user is either a left part area or a right part area in accordance with a touch position.

The method of determining a holding form and the method of determining an attended area, which are executed by the use form determining unit 55, will be described later in detail with reference to other drawings.

The application executing unit 56 executes a predetermined function (application) in accordance with a touch operation determined by the input operation determining unit 52. As examples of applications, there are a mail function, a text editing function, a web site reading function, a telephone directory function, and a game function, but the applications are not limited thereto. The application executing unit 56 realizes each function described above by executing each application program stored in the storage unit 60.

The application executing unit 56 executes a process corresponding to the touch operation information transmitted from the input operation determining unit 52 in accordance with the application program, generates a screen on which the execution result is reflected, and outputs the generated screen to the display control unit 54. For example, in a case where the touch operation gives an instruction for generating a mail, the application executing unit 56 relating to the mail function generates a user interface (UI) screen for inputting the text of the mail and outputs the generated UI screen to the display control unit 54.

The display control unit 54 displays information on the display panel 12. More specifically, the display control unit 54 outputs execution results (for example, a UI screen and the like) output by the use form determining unit 55 and the application executing unit 56 (and a process executing unit not illustrated in the drawing) to the display panel 12 as a video signal by controlling a data signal line driving circuit, a scan signal line driving circuit, a display control circuit, and the like, which are not illustrated in the drawing, included in the display device 1.

In this embodiment, the display control unit 54, particularly, according to the use form determined by the use form determining unit 55, changes the layout of the execution results such as the UI screen generated by the application executing unit 56.

A method of changing the layout that is executed by the display control unit 54 will be described later in detail with reference to other diagrams.

The storage unit 60 is a storage device that stores various kinds of data used by the display device 1. In this embodiment, the storage unit 60, at least, stores a map 61 and a layout determination rule 62. While not illustrated in the drawing, the storage unit 60 stores (1) control program and (2) OS program, which are executed by the display device 1, (3) various application programs executed by the display device 1 (the application executing unit 56), and (4) various kinds of data read in a case where the application programs are executed.

Various kinds of data stored in the storage unit 60 may be stored either in a volatile manner or in a non-volatile manner in accordance with the use. In other words, the storage unit 60 storing various kinds of data may be configured by a nonvolatile storage device such as ROM (read only memory) or flash memory or a volatile storage device such as RAM (random access memory) as a temporary storage unit, and a storage device that is optimal to the purpose is selected.

The map 61 is coordinate information representing the layout of the screen output to the display panel 12. More specifically, the map 61 includes a coordinate position of an object (including a UI component such as a software key), for which a touch operation can be executed, arranged on the screen. When a touch position is transmitted from the input operation determining unit 52, the application executing unit 56 can acquire an object for which a touch operation is executed by referring to the map 61 and can execute a process assigned to the object in advance.

The layout determination rule 62 is information designating a layout that is appropriate to the use form determined by the use form determining unit 55. The display control unit 54 can select a layout that is appropriate to the determined use form by referring to the layout determination rule 62 and change the layout of the screen to the selected layout. Accordingly, on the display panel 12, the screen of the layout that is appropriate to the user's use form at that time is displayed.

[Determination of Holding Form and Determination of Attended Area]

The use form determining unit 55, based on the touch operation information transmitted from the input operation determining unit 52, particularly, a touch position on the end face, determines a holding form and determines an attended area.

FIGS. 9(a) to 9(d) are diagrams that illustrate specific examples of the holding form, and more particularly, several examples of the touch position detected on the end face of the casing 17.

As illustrated in FIGS. 9(a) and 9(b), in a case where a user holds the display device 1 using one hand, normally, finger tips of five fingers and the base (hereinafter, referred to as a thenar) of the thumb are brought into contact with the end face. Among these, a range in which the thenar is brought into contact with the end face is wider than a range in which each of the five fingers is brought into contact therewith. For this reason, the use form determining unit 55 can specify a touch position (hereinafter, referred to as a wide touch position) extending in a range wider than that of each of the five fingers as a touch position of the thenar. In addition, as illustrated in the same drawing, the thumb and the thenar are brought into contact with a same side, and the remaining four fingers are brought into contact with a side opposing the side described above. For this reason, in a case where four touch positions (hereinafter, referred to as narrow touch positions) each having a relatively narrow range are detected on a same side, the use form determining unit 55 can specify the narrow touch positions as touch positions of the four fingers other than the thumb.

In this way, for left and right two sides of the end face that oppose each other, the use form determining unit 55 can specify a side with which the thumb and the thenar are brought into contact and a side, with which four fingers other than the thumb are brought into contact, opposing the side and can determine a holding form based on that. More specifically, as illustrated in FIG. 9(a), the use form determining unit 55, based on a wide touch position and two or more narrow touch positions, specifies that a side with which the thumb and the thenar are brought into contact is the left side, and a side with which four fingers are brought into contact is the right side. In the case of left-hand holding, the thumb is brought into contact with the left side, and the holding form is determined to be the left-hand holding. On the other hand, as illustrated in FIG. 9(b), the use form determining unit 55 specifies that a side with which the thumb and the thenar are brought into contact is the right side, and a side with which four fingers are brought into contact is the left side. Then, in the case of right-hand holding, since the thumb is brought into contact with the right side, the holding form is determined to be right-hand holding.

In addition, also in a case where a wide touch position is not detected in any side, the use form determining unit 55 can determine a holding form. For example, as illustrated in FIG. 9(c), a side on which no wide touch position is present, and at least two narrow touch positions are detected is specified as a side with which four fingers are brought into contact, and a side opposing the side can be specified as a side with which the thumb and the thenar are brought into contact. In the example illustrated in the drawing, the use form determining unit 55 determines that the holding form is left-hand holding. In addition, also in a case where two or more narrow touch positions are not detected in any side, the use form determining unit 55 can determine a holding form. For example, as illustrated in FIG. 9(d), a side on which one wide touch position is presented, and less than two narrow touch positions are present can be specified as a side with which the thumb and the thenar are brought into contact, and a side opposing the side can be specified as a side with which four fingers are brought into contact. In the example illustrated in the drawing, the use form determining unit 55 determines that the holding form is left-hand holding.

In this embodiment, in a case where a combination of the narrow touch positions and the wide touch position does not match any of the conditions described above, the use form determining unit 55 determines undeterminability and does not determine a holding form.

The holding form determining algorithm described above is an example, and thus, the method of determining a holding form that is executed by the use form determining unit 55 is not limited thereto. The use form determining unit 55 may determine right-hand holding or left-hand holding.

FIGS. 10(a) and 10(b) are diagrams that illustrate specific examples of the attended area, particularly, several examples of touch positions detected on the end face of the casing 17.

As illustrated in FIG. 10(a), a case will be assumed in which a user, while holding the display device 1 using one hand (here, the left hand), executes a touch operation for the display area P using the thumb of the holding hand, and an area (attended area) for which a touch operation is to be executed is an area (hereinafter, referred to as a near thumb area) disposed on a side close to the thumb. The example illustrated in FIG. 10(a) is an example of left-hand holding, and thus, in this example, the near thumb area is a left-half area of the display area P. In a case where the near thumb area of the left side is to be touched by the left hand, normally, while four fingers are brought into contact with the right side of the end face, the thenar is not in contact with the left side of the end face. By using such a characteristic, in a case where two or more narrow touch positions are detected on a same side, and a wide touch position is not detected on a side opposing the side, the use form determining unit 55 determines that the attended area attended by the user is the near thumb area. In addition, in a case where the holding form is right-hand holding, the thumb is brought into contact with the right side of the display area P, and accordingly, the near thumb area is a right half area of the display area P.

As illustrated in FIG. 10(b), a case will be assumed in which a user, while holding the display device 1 using one hand (here, the left hand), executes a touch operation for the display area P using the thumb of the holding hand, and an area (attended area) for which a touch operation is to be executed is an area (hereinafter, referred to as a far thumb area) disposed on a side far from the thumb. The example illustrated in FIG. 10(b) is an example of left-hand holding, and thus, in this example, the far thumb area is a right-half area of the display area P. In a case where the far thumb area of the right side is to be touched by the left hand, normally, while the thenar is brought into contact with the left side of the end face, four fingers are not in contact with the right side of the end face. By using such a characteristic, in a case where a wide touch position is detected on a certain side, and two or more narrow touch positions are not detected on a side opposing the side (in a case where the number of detected narrow touch positions is less than two), the use form determining unit 55 determines that the attended area is the far thumb area. In addition, in a case where the holding form is right-hand holding, the thumb is brought into contact with the right side, and accordingly, the far thumb area is a left half area of the display area P.

In this embodiment, in a case where a combination of the narrow touch positions and the wide touch position does not match any of the conditions described above, the use form determining unit 55 determines that there is no deviation in the attended area.

The use form determining unit 55 transmits the use form determined as above to the display control unit 54. In this embodiment, the use form output to the display control unit 54 includes information representing a holding form (right-hand holding or left-hand holding) and information representing an attended area (a near thumb area, a far thumb area, or no deviation).

In this way, the display control unit 54 can select a use form, in other words, a layout corresponding to the holding form and the attended area based on the layout determination rule 62.

[Layout Determination Rule and Layout]

FIG. 11 is a diagram that illustrates an example of the layout determination rule 62. In FIG. 11, while the layout determination rule 62 is represented to have a data structure of a table form as an example, the data structure is not intended to be limited to a table form. Subsequently, this similarly applies to the other diagrams used for describing the data structure.

As illustrated in FIG. 11, the layout determination rule 62 has a data structure in which an appropriate layout is associated with a combination of a holding form and an attended area. In the example illustrated in FIG. 11, while three kinds of layouts are defined in advance, that is merely an example, and there is no intention of limiting the layout determination rule 62. For example, six kinds of layouts may be defined for the combinations.

The display control unit 54 can select a layout corresponding to the use form determined by the use form determining unit 55 by referring to the layout determination rule 62 illustrated in FIG. 11. More specifically, for example, in a case where it is determined that the holding form is left-hand holding, and the attended area is a near thumb area, the display control unit 54 can select a layout having a wide left side. Then, the display control unit 54 changes the layout of the screen supplied from the application executing unit 56 to the layout having the wide left side. For example, the layout is changed as illustrated in FIGS. 12(a) to 12(c).

FIGS. 12(a) to 12(c) are diagrams that illustrate several specific examples of the layout defined in the layout determination rule 62.

In this embodiment, as an example, three kinds of layout are defined. FIG. 12(a) is a diagram that illustrates a specific example of a character inputting screen displayed on the display panel 12 based on the layout having the wide left side. FIG. 12(b) is a diagram that illustrates a specific example of the character inputting screen based on a normal layout. FIG. 12(c) is a diagram that illustrates a specific example of the character inputting screen based on a layout having a wide right side.

According to the layout determination rule 62 illustrated in FIG. 11, in a case where there is no deviation in the attended area, a normal layout is selected. In the normal layout, a screen of an execution result output by the application executing unit 56 is designated to be output to the display panel 12 with being maintained to be the original as a video signal. In this case, on the display panel 12, the screen generated by the application executing unit 56 is displayed as it is (FIG. 12(b)).

According to the layout determination rule 62 illustrated in FIG. 11, in a case where the holding form is the left-hand holding and the attended area is the near thumb area or in a case where the holding form is the right-hand holding and the attended area is the far thumb area, a layout having a wide left side is selected. As an example, the layout having the wide left side defines broadening of the horizontal widths of UI components of which the most of the UI components are arranged in a left ⅓ area of the display area among UI components included in the screen of the original execution result. For example, in a case where the character inputting screen illustrated in FIG. 12(b) is supplied from the application executing unit 56, the display control unit 54 enlarges the horizontal widths of UI components 80a to 80f based on the layout having the wide left side. While the enlargement rate is not particularly limited, in consideration of the operability and the visibility, it is preferable the enlargement rate is 1.5 times or less of the horizontal widths of the original UI components. On the other hand, the display control unit 54 reduces the horizontal widths of UI components disposed on the right side in correspondence with the broadening of the widths of the UI components disposed on the left side. While the reduction rate at this time is not particularly limited, in consideration of the operability and the visibility, it is preferable that the reduction rate is 0.5 times or more of the horizontal widths of the original UI components. The enlargement rate and the reduction rate are appropriately determined such that all the original UI components enter the display area, and the operability and the visibility are considered. The enlargement rate and the reduction rate may be dynamically determined by the display control unit 54 or may be defined in advance in the layout determination rule 62 for each layout. The character inputting screen of which the layout has been changed such that the left side is broadened by the display control unit 54, for example, as illustrated in FIG. 12(a), is displayed on the display panel 12.

Figure 12:
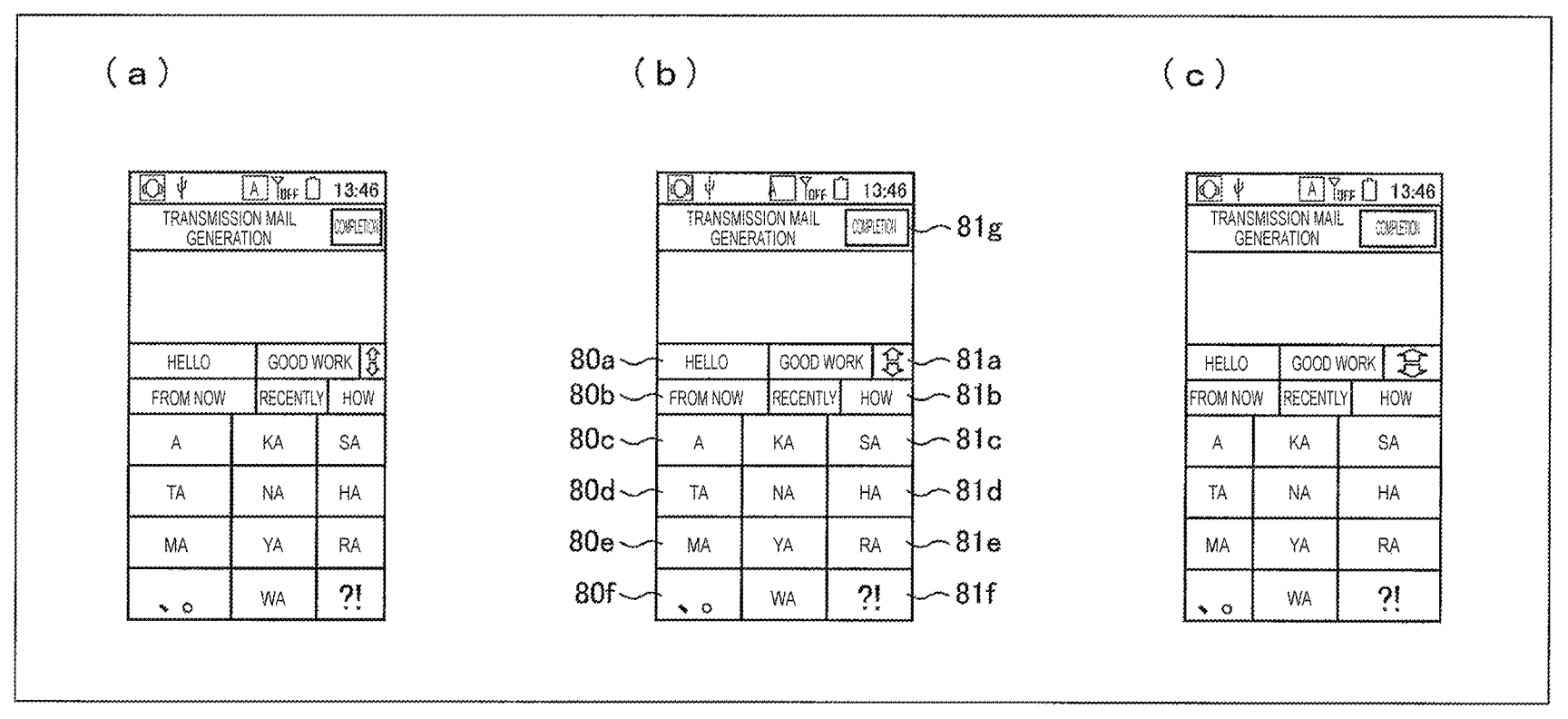

According to the layout determination rule 62 illustrated in FIG. 11, in a case where the holding form is the left-hand holding and the attended area is the far thumb area or in a case where the holding form is the right-hand holding and the attended area is the near thumb area, a layout having a wide right side is selected. To the contrary to the layout having the wide left side, as an example, the layout having the wide right side defines broadening of the horizontal widths of UI components of which the most of the UI components are arranged in a right ⅓ area of the display area among UI components included in the screen of the original execution result. In the example illustrated in FIGS. 12(*a*) and 12(*b*), the display control unit 54, based on the layout having the wide right side, enlarges the horizontal widths of UI components 81*a* to 81*g* and, on the contrary, reduces the horizontal widths of UI components arranged on the left side. Similar to the case of the layout having the wide left side, the enlargement rate and the reduction rate are appropriately determined. The character inputting screen of which the layout has been changed such that the right side is broadened by the display control unit 54, for example, as illustrated in FIG. 12(*c*), is displayed on the display panel 12.

[Process Flow]

Figure 13:
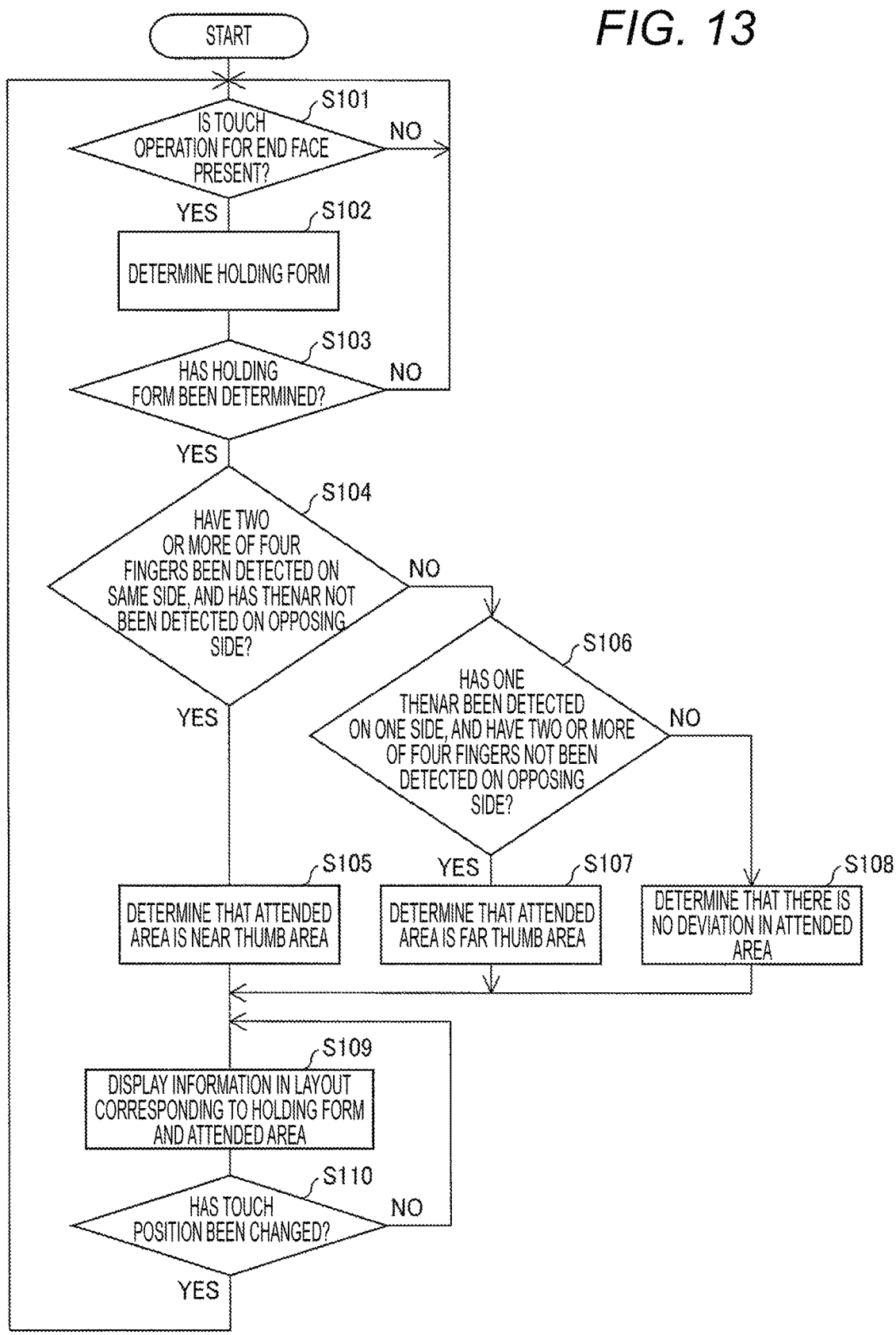
FIG. 13 is a flowchart that illustrates the flow of the process of a touch operation for an end face that is executed by the display device according to the first embodiment.
Figure 16:
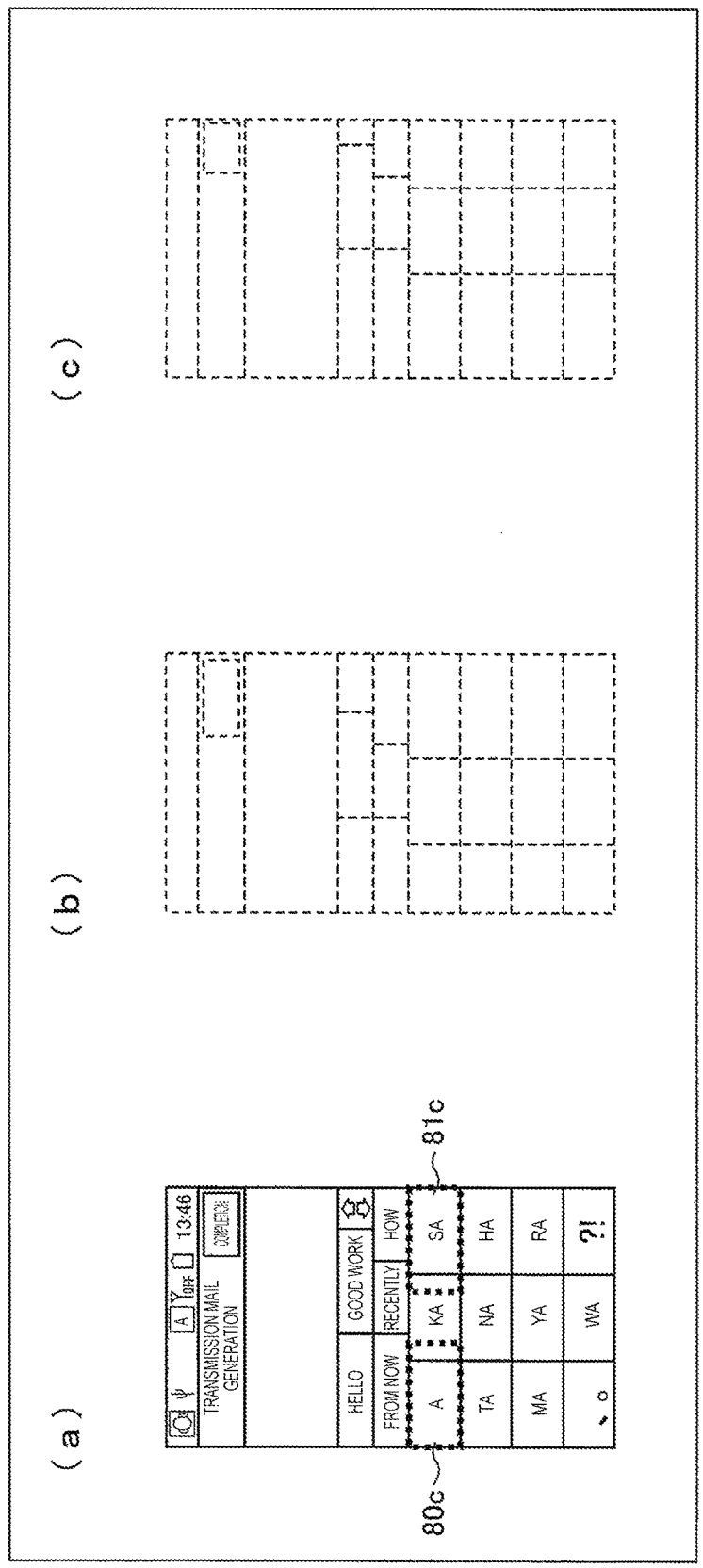
FIGS. 16(a) is a diagram that illustrates one specific example of a character inputting screen displayed on a display panel.
FIG. 16(b) is a diagram that illustrates a map (touchable area map) corresponding to the character inputting screen and, more particularly, is a diagram that illustrates a map after a correction according to a holding form that is left-hand holding.
FIG. 16(c) is a diagram that illustrates a map (touchable area map) corresponding to the character inputting screen and, more particularly, is a diagram that illustrates a map after a correction according to a holding form that is right-hand holding.

FIG. 13 is a flowchart that illustrates the flow of the process of a touch operation for the end face that is executed by the display device 1 according to the first embodiment.

When a touch operation for an end face (the outer surface A or B illustrated in FIGS. 6(*a*) and 6(*b*)) of the display device 1 is acquired by the operation acquiring unit 51 (Yes in S101), touch operation information including the touch position is supplied from the input operation determining unit 52 at least to the use form determining unit 55. The use form determining unit 55 determines the use form of the display device 1 based on the supplied touch operation information.

For example, the use form determining unit 55 determines a holding form based on the touch position (S102). Here, in a case where a holding form cannot be determined (No in S103), the display device 1 may be returned to a state in which a touch operation is received without determining an attended area.

The use form determining unit 55 determines an attended area together with (or following the determination of a holding form) determining a holding form based on the touch position. Described in more detail, in a case where two or more of four fingers (narrow touch positions) other than the thumb are detected on a same side of the display area, and a thenar (wide touch position) is not detected on a side opposing the side (Yes in S104), the use form determining unit 55 determines that the attended area is a near thumb area (S105). Here, in a case where the holding form is the left-hand holding, the attended area is determined to be a left area close to the thumb by the use form determining unit 55. On the other hand, in a case where the holding form is the right-hand holding, the attended area is determined to be a right area close to the thumb.

On the other hand, in a case where one thumb (wide touch position) is detected on any one side, and two or more of four fingers (narrow touch position) are not detected on a side opposing the side (No in S104, and Yes in S106), the use form determining unit 55 determines that the attended area is the far thumb area (S107). Here, in a case where the holding form is the left-hand holding, the attended area is determined to a right area located far from the thumb by the use form determining unit 55. On the other hand, in a case where the holding form is the right-hand holding, the attended area is determined to be a left area located far from the thumb.

In a case where a combination of the wide touch position and the narrow touch positions, which have been detected, does not match any of the conditions described above (No in S104 and No in S106), the use form determining unit 55 determines that the attended area does not deviate to any of the left and right sides (S108).

Subsequently, the display control unit 54 selects a layout corresponding to the use form (the holding form and the attended area) determined by the use form determining unit 55 by referring to the layout determination rule 62. Then, information is displayed on the display panel 12 based on the selected layout (S109). Here, the displayed information, for example, is a screen generated as the execution result of the process executed by the application executing unit 56 in accordance with the touch operation detected in S101.

Thereafter, until the touch position on the end face changes, the layout described above is maintained (No in S110), and, when the touch position on the end face changes (Yes in S110), the determination of a use form and the change of the layout are repeated based on the newly detected touch position. The configuration is not limited thereto, but, alternatively, a configuration may be employed in which the display control unit 54 maintains the layout changed as above for a predetermined time (for arbitrary n seconds) and, after an elapse of the predetermined time, returns the changed layout to the original layout.

As above, according to the above-described configuration of the display device 1 and the above-described method according to the first embodiment of the present invention, the information (the screen generated by the application executing unit 56) processed by the display device 1 is displayed on the display panel 12 after the layout is changed in accordance with the user's use form (12(*a*) to 12(*c*)).

More specifically, in a case where the user executes a touch operation using one hand, on the display area, an area that is located too far from the thumb and is difficult to operate and an area (an area located near the thumb's base or the like) that is too close to the thumb and is difficult to operate are generated. Thus, in a case where such an area difficult to operate is determined to be the attended area by the use form determining unit 55, the information (UI components) displayed in the area is displayed in an enlarged scale by the display control unit 54. In this way, in an area difficult to operate, the UI component that is an operation target is displayed in an enlarged scale, and accordingly, the user can easily operate the UI component that is the operation target. Consequently, an effect of realizing a display device capable of resolving a variation in the operability occurring in the display area and improving the operability is acquired.

Second Embodiment

Problem to be Solved by Invention

When a user executes a touch operation for a touch panel of a display device, there is a problem in that there is a variation in the degree of easiness/difficulty in the touch operation based on the position of a finger executing the touch operation and a position on the display area desired to be touched. Particularly, in a case where the user executes the touch operation using one hand, such a variation becomes remarkable. For example, as illustrated in FIGS. 10(*a*) and 10(*b*), in a case where the display device is held using the left hand, and a touch operation is executed using the thumb of the left hand, it is difficult to execute the operation for an area located too far from the thumb. In order to resolve such a variation in the operability, while the display mode may be considered to be changed according to the holding form like the technologies disclosed in Patent Literatures 1 and 2, when the display mode is frequently changed, the user becomes confused, and there is a problem in that the visibility is degraded.

Thus, in the second embodiment, a display device according to the present invention that is capable of resolving a variation in the degree of operability occurring in the display area and improving the operability, particularly, a display device allowing a user not to recognize a change in the layout and being capable of improving the operability without degrading visibility will be described in detail.

The second embodiment of the present invention will be described as below with reference to FIGS. 14 to 17. For the convenience of description, the same reference numeral is assigned to a member having the same function as a member described in the embodiment described above, and description thereof will not be presented.

[Functional Configuration of Display Device 1]

FIG. 14 is a functional block diagram that illustrates the configuration of a main portion of a display device 1. Differences between the display device 1 illustrated in FIG. 14 and the display device 1 illustrated in FIG. 1 is as follows. A control unit 50 further includes a touchable area correcting unit 57 as a functional block. A use form determined by a use form determining unit 55 is configured to be supplied not to a display control unit 54 but to an application executing unit 56 and the touchable area correcting unit 57 and be used by the application executing unit 56 and the touchable area correcting unit 57. A storage unit 60 stores a map correction rule 63 instead of the layout determination rule 62.

The first embodiment is premised on that the coordinate position of the visible area representing a position on the display panel 12 at which an object is displayed and the coordinate position of the touchable area representing a position on the touchpanel 14 at which a touch operation for the object is received match each other. On the other hand, in the second embodiment, there are cases where the coordinate position of a visible area and the coordinate position of a touchable area do not match each other on one screen. Thus, in the second embodiment, a map 61 has a data structure in which a touchable area map, in which the coordinate position of an object does not necessarily match the coordinate position of the visible area of a screen, is maintained in association with the screen output to the display panel 12 by a display control unit 54.

The use form determining unit 55 may determine at least a holding form but, unlike the first embodiment, does not necessarily determine an attended area.

The touchable area correcting unit 57 corrects the coordinate position of a touchable area of an object included in the map 61 (touchable area map) in accordance with the use form.

First, when a screen of an execution result is generated, the application executing unit 56 supplies the screen to the display control unit 54 and stores the map 61 corresponding to the screen in the storage unit 60. At this time point, the coordinate position of the touchable area of the object included in the map 61 matches the coordinate position of the visible area of the object on the display panel 12. Thereafter, a touch operation for an end face is detected, and a holding form is determined by the use form determining unit 55.

The touchable area correcting unit 57 makes a correction corresponding to the determined holding form for the map 61 based on the map correction rule 63.

[Map Correction Rule and Touchable Area Map]

FIG. 15 is a diagram that illustrates an example of the map correction rule 63.

As illustrated in FIG. 15, the map correction rule 63 has a data structure in which a correction content, in other words, information defining how to correct the map 61 is associated with each holding form. The correction content defined in the column of a map correction is an example, but the map correction rule 63 is not limited thereto.

The touchable area correcting unit 57 can make a map correction corresponding to the holding form determined by the use form determining unit 55 by referring to the map correction rule 63 illustrated in FIG. 15. More specifically, in a case where the holding form is determined to be the left-hand holding, the touchable area correcting unit 57 makes a correction for shifting the coordinate position of the touchable area included in the map 61 to the further left side than the coordinate positions of the visible area. While not illustrated in the drawing, it is assumed that the number of pixels by which the shift is made to the left side is also defined in the column of the map correction in advance.

FIG. 16(a) is a diagram that illustrates one specific example of the character inputting screen displayed on the display panel 12. In other words, the coordinate position of the visible area of the display panel 12 is illustrated. FIG. 16(b) is a diagram that illustrates the map 61 (touchable area map) corresponding to the character inputting screen and, more particularly, is a diagram that illustrates the map 61 after a correction according to a holding form that is the left-hand holding. As above, in a case where the holding form is determined to be the left-hand holding, the touchable area correcting unit 57 shifts the coordinate position of the touchable area to the further left side than the coordinate position of the original visible area based on the map correction rule 63. In this way, as illustrated in FIG. 16(b), the map 61 is updated so as to include the coordinate position after the correction.

Thereafter, when a touch position is transmitted from the input operation determining unit 52, the application executing unit 56 checks an object for which the touch operation has been executed based on the map 61 after the correction and executes a process assigned to the object in advance.

In other words, the character inputting screen displayed on the display panel 12 is as illustrated in FIG. 16(a). In contrast to this, a position at which a touch operation for each object (UI component) is received deviates to the further left side than the displayed position. For example, while an area in which a UI component 81c is displayed on the display panel 12, as illustrated in FIG. 16(a), enters the inside of a left ⅓ area according to its external appearance, an area for which a touch operation for the UI component 81c can be received, as illustrated in a range denoted by thick broken lines in FIG. 16(a), is corrected to the further left side than the external appearance.

Also in a case where the holding form is the right-hand holding, the touchable area is corrected in a same manner as that of a case where the holding form is the left-hand holding except for the reverse of the left/right sides.

FIG. 16(c) is a diagram that illustrates the map 61 (touchable area map) corresponding to the character inputting screen and, more particularly, is a diagram that illustrates the map 61 after a correction according to a holding form that is the right-hand holding.

In a case where the holding form is determined to be the right-hand holding, the touchable area correcting unit 57 shifts the coordinate position of the touchable area to the further right side than the coordinate position of the original visible area based on the map correction rule 63. In this way, as illustrated in FIG. 16(c), the map 61 is updated so as to include the coordinate position after the correction.

As illustrated in FIG. 16(a), for each UI component arranged on the character inputting screen, a position at which a touch operation for the UI component is received deviates to the further right side than the displayed position. For example, while the position at which the UI component 80c is displayed is as illustrated in FIG. 16(a), an area in which a touch operation for the UI component 80c can be received is corrected, as illustrated in a range denoted by thick broken lines in FIG. 16(a), to the further right side than the external appearance.

[Process Flow]

Figure 17:
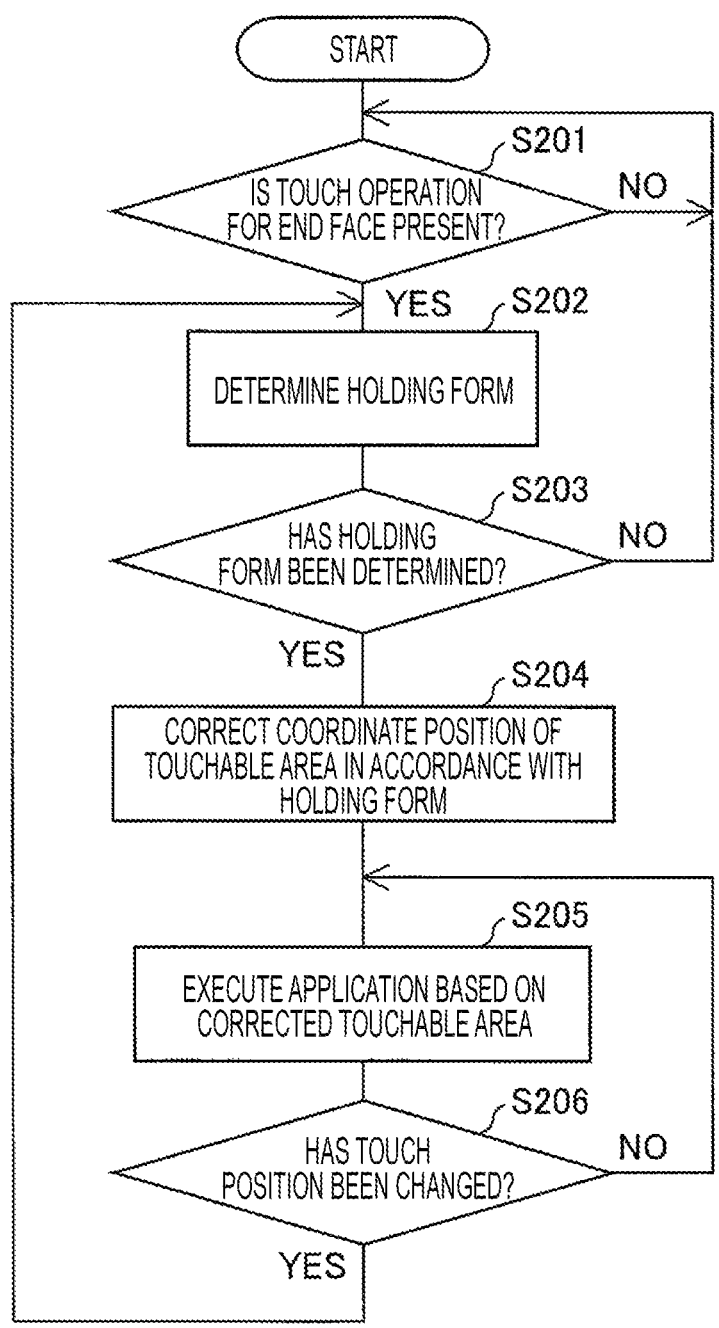
FIG. 17 is a flowchart that illustrates the flow of the process of a touch operation for an end face that is executed by the display device according to the second embodiment.

FIG. 17 is a flowchart that illustrates the flow of the process of a touch operation for an end face that is executed by the display device 1 according to the second embodiment.

When a touch operation for an end face of the display device 1 is acquired by the operation acquiring unit 51 (Yes in S201), touch operation information including the touch position is supplied from the input operation determining unit 52 at least to the use form determining unit 55. The use form determining unit 55 determines the use form of the display device 1, in other words, the holding form based on the supplied touch operation information (S202).

Here, in a case where a holding form cannot be determined (No in S203), the display device 1 is returned to a state in which a touch operation is received.

Subsequently, the touchable area correcting unit 57 corrects the coordinate position of the touchable area in accordance with the holding form determined by the use form determining unit 55 based on the map correction rule 63 (FIG. 15) (S204).

The application executing unit 56 executes an application by referring to the map 61 after the correction (S205). In other words, in a case where a certain touch operation is executed for the display area, an object touched by the touch operation is determined based on the map 61 after the correction.

Thereafter, until the touch position on the end face changes, the map 61 after the correction is maintained, and the application executing unit 56 continues the process based on the map 61 (No in S206). When the touch position on the end face changes (Yes in S206), the determination of a holding form and the correction of the map 61 are repeated based on the newly detected touch position.

As above, according to the above-described configuration of the display device 1 and the above-described method according to the second embodiment of the present invention, the operability for the area located far from the thumb can be improved. In a case where the display device 1 is operated using one hand holding the display device 1, it is difficult for the thumb to arrive at an area of the display area located far from the thumb. For this reason, an actual touch position tends to unintentionally deviate to the thumb side. However, according to the above-described configuration of the present invention, the touchable area is corrected to the thumb side, and accordingly, the above-described deviation can be offset. In addition, UI components that are actually displayed on the display panel 12 are arranged according to a normal layout, and there is no change in the display positions thereof. For this reason, since there is no change in the external appearance, the user does not need to recognize a change in the layout, and the visibility is not degraded. Consequently, an effect of realizing a display device improving the operability without degrading the visibility is acquired.

Third Embodiment

Problem to be Solved by Invention

When a user executes a touch operation for a touch panel of a display device, there is a problem in that there is a variation in the degree of easiness/difficulty in the touch operation based on the position of a finger executing the touch operation and a position on the display area desired to be touched. Particularly, in a case where the user executes the touch operation using one hand, such a variation becomes remarkable. For example, as illustrated in FIGS. 10(a) and 10(b), in a case where the display device is held using the left hand, and a touch operation is executed using the thumb of the left hand, it is difficult to execute an operation for an area located too far from the thumb, and, on the contrary, it is difficult to execute an operation for an area located too close to the thumb. Particularly, it is further difficult to execute an operation for an area located near the base of the thumb. As above, a variation in the operability occurring inside the display area is not resolved by only determining a holding form like the technologies disclosed in Patent Literatures 1 and 2. In addition, in a case where the display mode is frequently changed, the user is confused, and there is a problem in that the visibility is degraded.

Thus, in the third embodiment, a display device according to the present invention capable of resolving a variation in the operability occurring inside the display area and improving the operability, particularly, a display device not allowing the user to recognize a change in the layout and improving the operability without degrading the visibility will be described in detail.

The third embodiment of the present invention will be described as below with reference to FIGS. 14 and 18 to 20. For the convenience of description, the same reference numeral is assigned to a member having the same function as a member described in each embodiment described above, and description thereof will not be presented.

[Functional Configuration of Display Device 1]

The configuration of a main portion of a display device 1 according to the third embodiment is the same as that of the display device 1 according to the second embodiment except for the following points and is as illustrated in FIG. 14.

In the display device 1 according to this embodiment, a use form determining unit 55, similar to that of the first embodiment, is configured to determine an attended area together with a holding form as the use form.

A map correction rule 63 has a data structure in which a correction content is associated with a combination of the holding form and the attended area.

A touchable area correcting unit 57 is configured to correct the coordinate position of the touchable area with a correction position and the degree of the correction being changed based on the correction content corresponding to the holding form and the attended area.

[Map Correction Rule and Touchable Area Map]

FIG. 18 is a diagram that illustrates an example of the map correction rule 63.

As illustrated in FIG. 18, in the map correction rule 63 according to this embodiment, a correction content is associated with a combination of the holding form and the attended area. In the correction content, in addition to a correction direction, an area that is a correction target and the degree of the correction are defined.

The touchable area correcting unit 57 can make a map correction corresponding to the use form determined by the use form determining unit 55 by referring to the map correction rule 63 illustrated in FIG. 18. More specifically, in a case where it is determined that the holding form is the left-hand holding, and the attended area is the near thumb area, the touchable area correcting unit 57 makes a correction for shifting the coordinate position of the touchable area of an object of which the most is included in a left half area (see FIGS. 10(*a*) and 10(*b*)) of the display area P to the further right side than the coordinate position of the visible area by an offset value of two. As the numerical value of the offset value is larger, the degree of the correction is becomes higher. Here, the number of pixels corresponding to an "offset value 1" is not particularly limited but, while not illustrated in the drawing, is assumed to be defined inside the table of the map correction rule 63 or any other table in advance based on the actual size of the display area of the display device 1 and the like.

In the example illustrated in FIG. 18, the offset value is defined such that the amount of the correction is larger in a case where the attended area is the near thumb area than in a case where the attended area is the far thumb area. In a case where the attended area is the far thumb area, a correction target range and a correction direction are defined such that the touchable area of the far thumb area is corrected to the thumb side. On the other hand, in a case where the attended area is the near thumb area, a correction target range and a correction direction are defined such that the touchable area of the near thumb area is corrected in a direction separated away from the thumb.

The correction content described above is defined based on tendencies of user's erroneous operations described below. When an operation for the far thumb area is executed, a touch position tends to be unintentionally shifted to the thumb side. When an operation for the near thumb area is executed, it is difficult to execute the operation near the thumb, and the touch position tends to be unintentionally shifted in a direction separated away from the thumb. In addition, it is more difficult to execute an operation for the near thumb area, particularly, an area located near the base of the thumb or the like than for the far thumb area, and the near thumb area tends to have a deviation larger than the far thumb area. Accordingly, by defining the correction content as described above, the deviation of the touch position can be offset more appropriately in consideration of the tendencies of the user's erroneous operations.

Figure 19:
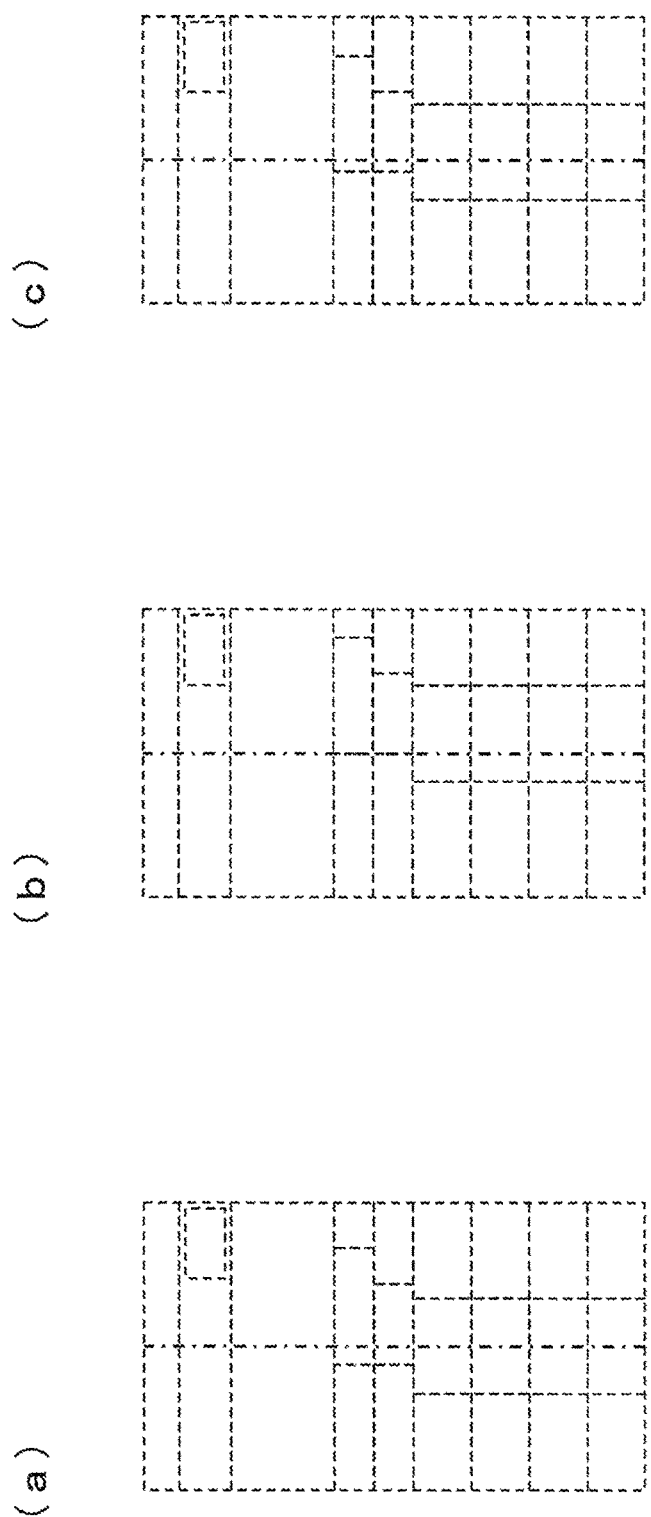
FIG. 19(a) is a diagram that illustrates a map before a correction corresponding to an original character inputting screen generated by an application executing unit.
FIG. 19(b) is a diagram that illustrates a map after a correction made by a touchable area correcting unit in a case where the holding form is left-hand holding, and the attended area is a near thumb area.
FIG. 19(c) is a diagram that illustrates a map after a correction made by the touchable area correcting unit in a case where the holding form is right-hand holding, and the attended area is a far thumb area.

FIG. 19(*a*) is a diagram that illustrates the map 61 before the correction corresponding to the original character inputting screen generated by the application executing unit 56. FIG. 19(*b*) is a diagram that illustrates the map 61 after the correction made by the touchable area correcting unit 57 in a case where the holding form is left-hand holding, and the attended area is the near thumb area. FIG. 19(*c*) is a diagram that illustrates the map 61 after the correction made by the touchable area correcting unit 57 in a case where the holding form is the right-hand holding, and the attended area is the far thumb area.

In a case where the holding form is the left-hand holding, and the attended area is the near thumb area, the touchable area correcting unit 57, as illustrated in FIG. 19(*b*), makes a correction for shifting the touchable area of a target UI component based on the map correction rule 63. More specifically, the touchable area correcting unit 57 shifts the touchable area of each UI component of which most is included in a left half area (an area located to the left side of a dashed line) of the display area to the further right side (a direction separated away from the thumb) than the coordinate position of the visible area by a distance corresponding to two offset values.

In a case where the holding form is the right-hand holding, and the attended area is the far thumb area, the touchable area correcting unit 57, as illustrated in FIG. 19(*c*), makes a correction for shifting the touchable area of a target UI component based on the map correction rule 63. More specifically, the touchable area correcting unit 57 shifts the touchable area of each UI component of which most is included in the left half area of the display area to the further right side (thumb side) than the coordinate position of the visible area by a distance corresponding to one offset value.

While not illustrated in the drawing, in a case where the holding form is the right-hand holding, and the attended area is the near thumb area, the touchable area correcting unit 57 shifts the touchable area of each UI component of which most is included in the right half area of the display area to the further left side (a direction separated away from the thumb) than the coordinate position of the visible area by a distance corresponding to two offset values. In a case where the holding form is the left-hand holding, and the attended area is the far thumb area, the touchable area correcting unit 57 shifts the touchable area of each UI component of which most is included in the right half area of the display area to the further left side (thumb side) than the coordinate position of the visible area by a distance corresponding to one offset value.

In a case where it is determined that there is no deviation in the attended area, the touchable area correcting unit 57 may not make a correction. In such a case, as illustrated in FIG. 19(*a*), the original map 61 is continuously stored in the storage unit 60.

[Process Flow]

Figure 20:
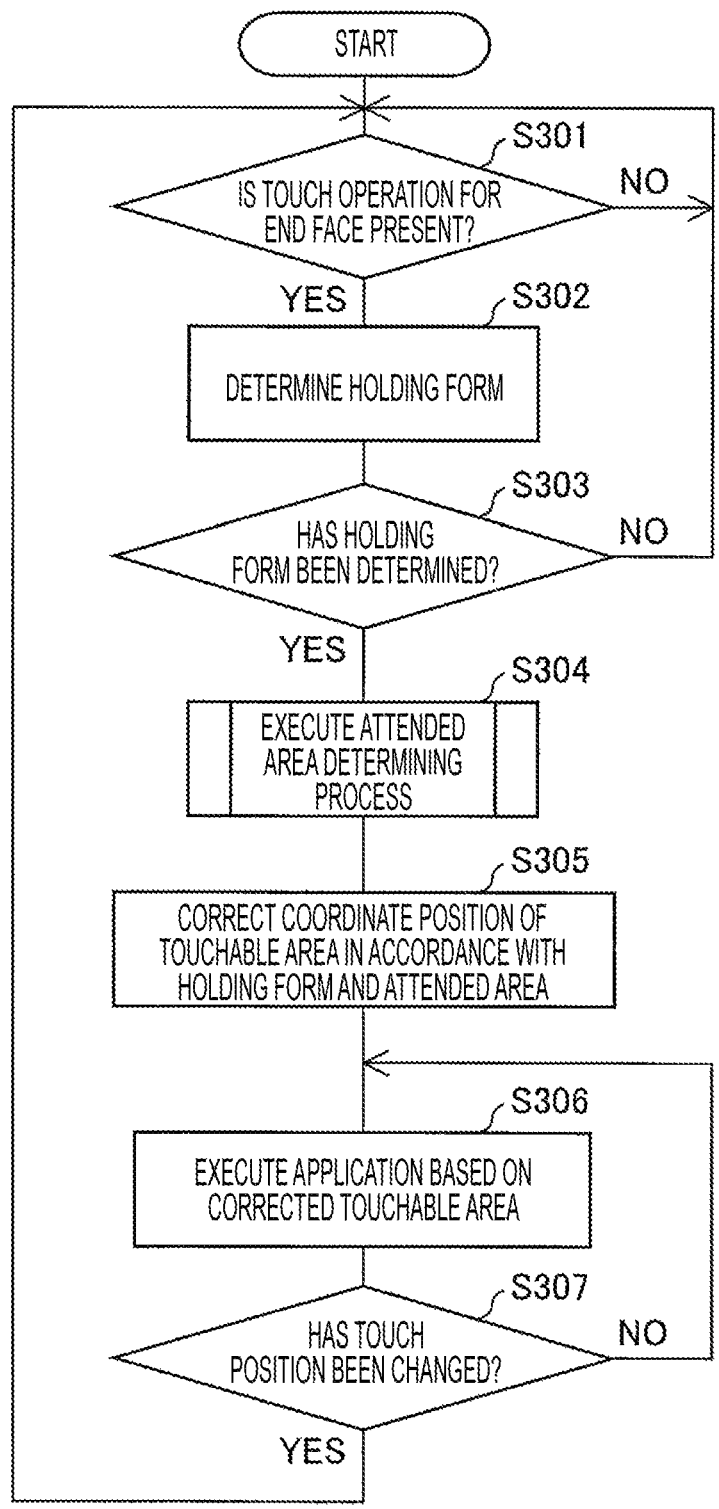
FIG. 20 is a flowchart that illustrates the flow of the process of a touch operation for an end face that is executed by a display device according to the third embodiment.

FIG. 20 is a flowchart that illustrates the flow of the process of a touch operation for an end face that is executed by the display device 1 according to the third embodiment.

S301 to S303 correspond to the process flow S101 to S103 according to the first embodiment. An attended area determining process of S304 corresponds to the process flow S104 to S108 according to the first embodiment.

In this way, when the holding form and the attended area are determined by the use form determining unit 55, subsequently, the touchable area correcting unit 57 corrects the coordinate position of the touchable area in accordance with the holding form and the attended area, which have been determined, based on the map correction rule 63 (FIG. 18) (S305). More specifically, the process is as described above, and here, the description thereof will not be repeated.

S306 to S307 correspond to the process flow S205 to S206 according to the second embodiment.

As above, according to the above-described configuration of the display device 1 and the above-described method according to the third embodiment of the present invention, the operability for the area located far from the thumb and the area located close to the thumb can be improved, and a variation in the operability for areas can be resolved.

In addition, since the correction target range, the correction direction, and the degree of the correction can be changed according to the use form, a deviation of the touch operation can be offset more appropriately in consideration of the trends of user's erroneous operations.

In addition, UI components that are actually displayed on the display panel 12 are arranged according to a normal layout, and there is no change in the display positions thereof. For this reason, since there is no change in the external appearance, the user does not need to recognize a change in the layout, and the visibility is not degraded. Consequently, an effect of realizing a display device appropriately improving the operability in accordance with the use form without degrading the visibility is acquired.

Modified Example (Display UI Component in Accordance with Touch Position of Thumb)

In the first to third embodiments, the display device 1 may display UI components that can be operated according to a touch operation for an end face using the thumb on the display panel 12.

Figure 21:
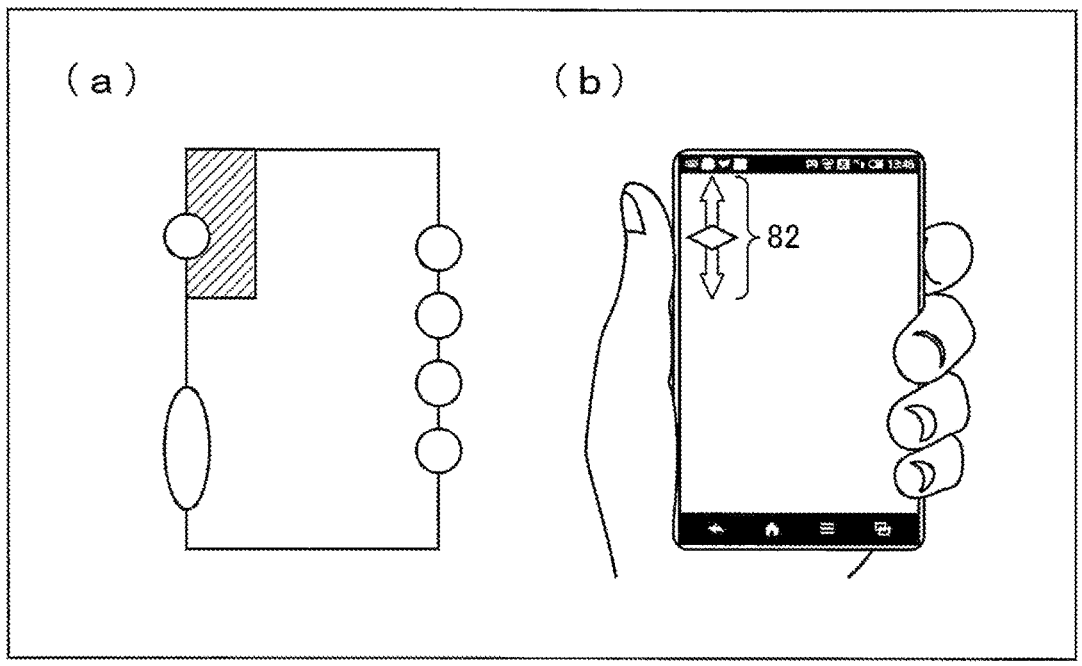
FIGS. 21(a) and 21(b) are diagrams that illustrate the function of the display device according to the present invention that displays UI components in accordance with a touch position of a touch operation for the end face.

FIGS. 21(*a*) and 21(*b*) are diagrams that illustrate the function of the display device 1 displaying the UI components described above.

More specifically, first, the use form determining unit 55 specifies a touch position of the thumb on the end face based on the touch operation information supplied from the input operation determining unit 52. As illustrated in FIG. 21(*a*), the use form determining unit 55 can specify a narrow touch position detected on a same side as that of a wide touch position, in other words, the thenar as a touch position of the thumb. Alternatively, also when a wide touch position is not detected, in a case where two or more narrow touch positions are detected on one side, one narrow touch position on a side opposing the side can be specified as a touch position of the thumb.

The use form determining unit 55 supplies the touch position of the thumb to the application executing unit 56. The application executing unit 56 arranges a UI component 82 in a predetermined range (for example, a hatched range illustrated in FIG. 21(*a*)) having the specified position of the thumb as the reference. A screen including the UI component 82 generated by the application executing unit 56 is supplied to the display control unit 54. The display control unit 54, as illustrated in FIG. 21(*b*), displays the screen described above on the display panel 12.

In this way, since the UI component 82 is displayed at a position for which an operation can be easily executed by the user using the thumb, the user's operability is improved. In the example illustrated in FIG. 21(*b*), the UI component 82, for example, is a slide bar. The user slides the thumb on the end face or slides the thumb on a display area in which the UI component 82 is displayed, thereby being capable of freely moving the position of the slide sum (tab).

In the first and third embodiments, the application executing unit 56 may execute switching between display/non-display of the UI component 82 in accordance with the attended area. For example, in a case where the user's attended area is the far thumb area, there is hardly a possibility that a touch operation is executed for the UI component 82 arranged near the touch position of the thumb. For this reason, in a case where the attended area is determined to be the far thumb area, the application executing unit 56 may set the UI component 82 arranged near the thumb to be in a non-display state.

(Change or Correction of Vertical Direction)

In the first embodiment, the display device 1 (the display control unit 54) is configured to expand/contract the horizontal direction, in other words, the horizontal width of the object in accordance with the use form. However, the display control unit 54 may be configured to additionally expand/contract the vertical direction, in other words, the height of the object based on the layout determination rule 62.

In the second and third embodiments, the display device 1 (the touchable area correcting unit 57) is configured to correct the coordinate position of the object in the horizontal direction in accordance with the use form. However, the touchable area correcting unit 57 may be configured to additionally correct the coordinate position in the vertical direction based on the map correction rule 63.

[Example of Realization Using Software]

The control blocks (particularly, the operation acquiring unit 51, the input operation determining unit 52, the display control unit 54, the use form determining unit 55, the application executing unit 56, and the touchable area correcting unit 57) of the display device 1 may be realized by either logical circuits (hardware) formed on an integrated circuit (IC chip) or software using a CPU (central processing unit).

In the latter case, the display device 1 includes: a CPU that executes an instruction of a program that is software realizing each function; ROM (read only memory) or a storage device (this will be referred to as a "recording medium") in which the program and various kinds of data are recorded in a computer-readable (or CPU-readable) form; and RAM (random access memory) in which the program is expanded; and the like. The computer (or the CPU) reads the program from the recording medium and executes the read program, whereby an object of the present invention is achieved. As the recording medium, "a medium of a non-transient type", for example, a tape, a disk, a card, a semiconductor memory, a programmable logical circuit, or the like may be used. In addition, the program may be supplied to the computer through an arbitrary transmission medium (a communication network, a broadcast wave, or the like) capable of transmitting the program. Furthermore, the present invention can be realized in the form of a data signal embedded in a carrier wave that is embodied through electronic transmission of the program.

SUMMARY

A display device according to a first aspect of the present invention includes: a display member (display panel 12); an operation detecting member (touch panel 14) that is superimposed on the display member; and a casing (17) in which the display member and the operation detecting member are stored. In the display device (1), the operation detecting member detects a touch operation for a display area (P) of the display member, and a part of the operation detecting member detects a touch operation for an end face (outer surface A or outer surface B) of the casing other than the display area. The display device further includes: a use form determining unit (55) that determines a holding form based on a touch position of the touch operation for the end face, which is detected by the operation detecting member, and determines an attended area that is an area of the display area attended by a user for a touch operation; and a display control unit (54) that changes a display mode of a screen to be displayed on the display member based on the holding form and the attended area determined by the use form determining unit.

According to the configuration described above, the use form determining unit determines a form at the time of user's holding of the display device, in other words, a holding form based on the touch position of the touch operation for the end face. Together with the holding form, an area attended by the user for a touch operation, in other words, an attended area is determined. Then, the display control unit changes a display mode of a screen to be displayed on the display member based on the holding form and the attended area.

In this way, in the display device in which the operation detecting member executes both the detection of a touch operation for the display area and a touch operation for the end face of the casing, the display mode of the screen displayed on the display member is changed in consideration of the attended area in addition to the holding form.

In other words, during user's use, when the screen is displayed on the display member, the display mode is maintained to be an optimal mode matching the form in which the user holds the display device and a position of the display area attended by the user.

As a result, by providing a user interface according to the use form without complicating the detection mechanism of the display device, an effect of improving the operability is acquired.

In a display device according to a second aspect of the present invention, in the first aspect described above, the display control unit enlarges at least a horizontal width of an object displayed in a part of the display area specified based on the holding form and the attended area, which are determined, among objects, for which a touch operation can be executed, included on the screen.

According to the configuration described above, the holding form and the attended area are determined by the use form determining unit, whereby a portion of the display area that is to be operated by the user is concretely specified. The display control unit executes a process of enlarging the horizontal width of objects displayed in an area to be operated by the user among objects for which the touch operation can be executed inside the screen.

In this way, the objects displayed on the area to be operated by the user are displayed to have a horizontal width larger than the original size. For this reason, it is easy for the user to execute a touch operation for the objects displayed on the area described above.

As a result, an effect of realizing a display device capable of improving the operability is acquired.

In a display device according to a third aspect of the present invention, in the second aspect described above, the display control unit enlarges a horizontal width of at least some of objects displayed in a left half of the display area in a case where it is determined by the use form determining unit that the holding form is left-hand holding, and the attended area is a near thumb area disposed on a side close to a thumb of a holding hand or in a case where it is determined that the holding form is right-hand holding, and the attended area is a far thumb area disposed on a side far from the thumb of the holding hand and enlarges a horizontal width of at least some of objects displayed in a right half of the display area in a case where it is determined by the use form determining unit that the holding form is the right-hand holding, and the attended area is a near thumb area or in a case where it is determined that the holding form is the left-hand holding, and the attended area is a far thumb area.

According to the configuration described above, the use form determining unit determines whether the holding form is the right-hand holding or the left-hand holding and determines whether the attended area is located on the side close to the thumb or on the side far from the thumb. Based on the holding form and the attended area determined in this way, the area to be operated by the user, concretely, is specified as the left half area of the display area or the right half area.

In a case where the user executes a touch operation using one hand, on the display area, an area that is located too far from the thumb and is difficult to operate and an area that is located too close to the thumb and is difficult to operate are generated. The display control unit can execute display with the horizontal width of objects (UI components or the like) displayed in the left half area on the display area or the right half area that is specified, in other words, an area that is difficult to operate being widened.

In this way, in an area that is attended by the user for an operation and is difficult for the user to operate, at least the horizontal width of the object that is an operation target is enlarged and displayed. Accordingly, the user can easily operate the object that is an operation target. As a result, a display device capable of resolving a variation in the operability due to the generation of an area difficult to operate in a part of the display area and improving the operability is acquired.

A display device according to a fourth aspect of the present invention includes: a display member (display panel 12); an operation detecting member (touch panel 14) that is superimposed on the display member; and a casing (17) in which the display member and the operation detecting member are stored. In the display device, the operation detecting member detects a touch operation for a display area (P) of the display member, and a part of the operation detecting member detects a touch operation for an end face (outer surface A or outer surface B) of the casing other than the display area. The display device further includes: a storage member (60) that stores positions of touchable areas in which, for one or more objects included on a screen displayed on the display member, touch operations for the objects can be received; a use form determining unit (55) that determines a holding form based on the touch position of the touch operation for the end face that is detected by the operation detecting member; and a touchable area correcting unit (57) that corrects the positions of the touchable areas of the objects stored in the storage member based on the holding form determined by the use form determining unit.

According to the configuration described above, on the screen displayed on the display member, one or more objects for which a touch operation can be executed are included. In the storage member, information (the positions of touchable areas) representing a position of the operation detecting member that is desirable to be touched so as to touch each object is stored. The touchable area correcting unit corrects the positions of touchable areas stored in the storage member in accordance with the determined holding form.

In this way, the position of the touchable area in which the touch operation for an object is received is corrected in a predetermined direction from the display position of the object displayed on the display member. According to such a correction, a deviation of the touch position based on a user's erroneous operation that may easily occur according to the holding form can be offset. The erroneous operation, for example, is an erroneous operation such as an unintentional touch of a place disposed in front of a target object in a case where the object disposed in an area with which it is difficult for a finger to be in touch is to be touched.

In addition, since the correction is made for the position of the touchable area that is stored in the storage member, a result of the correction does not appear on the screen displayed on the display member. Thus, since a change in the external appearance does not occur, the user does not need to recognize a change in the layout, and the visibility is not degraded.

As a result, an effect of improving the operability by offsetting a deviation of the touch position due to an erroneous operation without degrading the visibility is acquired.

In a display device according to a fifth aspect of the present invention, in the fourth aspect described above, the touchable area correcting unit corrects the positions of the touchable areas of at least some of the objects displayed on the display area to a left side in a case where the holding form is determined to be left-hand holding by the use form determining unit and corrects the positions of the touchable areas of at least some of the objects to a right side in a case where the holding form is determined to be right-hand holding.

In this way, the operability for an area located too far from a position at which a finger (the thumb or the like) executing a touch operation is present can be improved. In a case where the display device is operated using one hang holding the display device, it is difficult for the thumb to be in touch with an area of the display area that is located far from the thumb. For this reason, the actual touch position tends to unintentionally deviate to the thumb side. However, according to the above-described configuration of the present invention, the touchable area correcting unit corrects the position of the touchable area to the right side or the left side, in other words, to the thumb side based on the determined holding form. For this reason, the above-described deviation can be offset. In addition, UI components that are actually displayed on the display member are arranged according to a normal layout, and there is no change in the display positions thereof. For this reason, since there is no change in the external appearance, the user does not need to recognize a change in the layout, and the visibility is not degraded. Consequently, an effect of realizing a display device improving the operability without degrading the visibility is acquired.

In a display device according to a sixth aspect of the present invention, in the fourth aspect described above, the use form determining unit determines an attended area of the display area that is an area attended for a touch operation by a user in addition to the holding form, and the touchable area correcting unit corrects the positions of the touchable areas of the objects with a correction target range on the display area, a correction direction, and a degree of the correction being changed based on the holding form and the attended area determined by the use form determining unit.

The tendencies of erroneous operations relating to a deviation of the user's touch position are various according to the use form, in other words, the holding form and the attended area. Thus, it is necessary to make an appropriate correction in accordance with the use form.

According to the configuration described above, in accordance with the determined use form, the touchable area correcting unit makes a correction of the positions of the touchable areas of objects disposed inside a range of the display area that is appropriate for the tendency of deviations that may easily occur in the use form in an appropriate direction by an appropriate amount.

As a result, an effect of improving the operability by appropriately offsetting the deviation of the touch position in accordance with the use form is acquired.

In a display device according to a seventh aspect of the present invention, in the six aspect described above, the touchable area correcting unit corrects the positions of the touchable areas of at least some of the objects displayed in a left half of the display area to a right side by a distance corresponding to a first offset value in a case where it is determined by the use form determining unit that the holding form is left-hand holding, and the attended area is a near thumb area disposed on a side close to a thumb of a holding hand, corrects the positions of the touchable areas of at least some of the objects displayed in a right half of the display area to a left side by a distance corresponding to a second offset value that is less than the first offset value in a case where it is determined by the use form determining unit that the holding form is the left-hand holding, and the attended area is a far thumb area disposed on a side far from the thumb of the holding hand, corrects the positions of the touchable areas of at least some of the objects displayed in the right half of the display area to the left side by a distance corresponding to the first offset value in a case where it is determined by the use form determining unit that the holding form is right-hand holding, and the attended area is the near thumb area, and corrects the positions of the touchable areas of at least some of the objects displayed in the left half of the display area to the right side by a distance corresponding to the second offset value in a case where it is determined by the use form determining unit that the holding form is the right-hand holding, and the attended area is the far thumb area.

In this way, the operability for an area located too far from a position at which a finger (the thumb or the like) executing a touch operation is present and an area located too close to the thumb can be improved, whereby a variation in the operability for areas can be resolved.

More specifically, the user tends to touch a position located on the further thumb side than an intended position in an area located too far from the thumb. On the other hand, in an area located too close to the thumb, the user tends to touch a position located farther from the thumb than an intended position. Particularly, since it is difficult to operate a position near the base of the thumb, a deviation of the touch position may easily increase more than that at the time of operating an area located too far from the thumb and that at the time of operating an area located too close to the thumb.

In consideration of such tendencies, in a case where it is determined that the near thumb area is attended, the touchable area correcting unit corrects the touchable area based on the first offset value that is a relatively large value. The direction of the correction is specified as a direction in which the deviation is offset based on the holding form and the attended area in consideration of the tendencies of erroneous operations.

As a result, an effect of improving the operability by more appropriately offsetting the positional deviation in accordance with the use form without degrading the visibility is acquired.

In a display device according to an eighth aspect of the present invention, in the first to third, sixth, and seventh aspects, the use form determining unit, in a case where a touch position of which a detection range is wider than a predetermined value is present among a plurality of touch positions detected on the end face by the operation detecting member, specifies the touch position as a touch position of a thenar, in a case where a touch position of which a detection range is narrower than a predetermined value is present, specifies the touch position as a touch position of the thumb and any one of four fingers other than the thumb, and determines whether the attended area is a near thumb area disposed on a side close to the thumb of a holding hand or a far thumb area disposed on a side far from the thumb of the holding hand based on a combination of the touch positions of the thumb, the four fingers, and the thenar.

In this way, the display device, together with determining whether the user holds the display device by using the left hand or the right hand, can determine an area (for example, an area disposed on a side close to the thumb or an area disposed on a side far from the thumb) attended by the user.

A touch-operation processing method according to a ninth aspect of the present invention is a touch-operation processing method executed by a display device including: a display member; an operation detecting member that is superimposed on the display member; and a casing in which the display member and the operation detecting member are stored, the operation detecting member detecting a touch operation for a display area of the display member, and a part of the operation detecting member detecting a touch operation for an end face of the casing other than the display area. The touch-operation processing method includes: determining a holding form based on a touch position of the touch operation for the end face, which is detected by the operation detecting member, and determining an attended area of the display area that is an area of the display area attended by a user for a touch operation; and changing a display mode of a screen to be displayed on the display member based on the holding form and the attended area determined in the determining of a holding form and an attended area.

Accordingly, by providing a user interface according to the use form without complicating the detection mechanism of the display device, an effect of improving the operability is acquired.

The display device according to each aspect of the present invention may be realized by a computer. In such a case, a display device control program realizing the display device using a computer by causing the computer to operate as each unit included in the display device and a computer-readable recording medium having the control program recorded thereon belong to the scope of the present invention.

The present invention is not limited to each embodiment described above, but various changes can be made therein in a range represented in the claim, and an embodiment acquired by appropriately combining technical means disclosed in mutually-different embodiments belong to the technical scope of the present invention. In addition, by combining technical means disclosed in the embodiments, a new technical aspect can be formed.

INDUSTRIAL APPLICABILITY

The present invention can be used for a display device capable of detecting a touch operation (a contact or an approach) of a finger or the like into an end face of a casing of the display device, for example, a multi-function mobile phone, a tablet, a monitor, a television set, and the like. Particularly, the present invention can be appropriately used for a display device (multi-function mobile phone or the like) having a relatively small size for which a touch operation can be executed by using one hand holding the display device.

REFERENCE SIGNS LIST

1 Display device
12 Display panel (display member)
14 Touch panel (operation detecting member)
17 Casing
50 Control unit
51 Operation acquiring unit
52 Input operation determining unit
54 Display control unit
55 Use form determining unit
56 Application executing unit
57 Touchable area correcting unit
60 Storage unit (Storage member)
61 Map
62 Layout determination rule
63 Map correction rule

The invention claimed is:

1. A display device comprising:
 a display member;
 an operation detecting member that is superimposed on the display member;
 a casing in which the display member and the operation detecting member are stored;
 the operation detecting member detecting a touch operation for a display area of the display member, and a part of the operation detecting member detecting a touch operation for an end face of the casing other than the display area,
 a use form determining unit that determines a holding form based on a touch position of the touch operation for the end face, which is detected by the operation detecting member and determines an attended area that is an area of the display area attended by a user for a touch operation; and
 a display control unit that changes a display mode of a screen to be displayed on the display member based on the holding form and the attended area determined by the use form determining unit;
 wherein the end face is an outer surface; and
 wherein a shortest distance between the operation detecting member and the outer surface is less than or equal to a maximum detectable distance in which the touch operation for the outer surface is detectable by the operation detecting member.

2. The display device according to claim 1, wherein the display control unit enlarges at least a horizontal width of an object displayed in a part of the display area specified based on the holding form and the attended area, which are determined, among objects, for which a touch operation can be executed, included on the screen.

3. The display device according to claim 2, wherein the display control unit enlarges a horizontal width of at least some objects displayed in a left half portion of the display area when the use form determining unit determines the holding form is left-hand and determines the attended area is a thumb area disposed on a side close to a thumb of a holding hand or when the holding form is determined to be a right-hand holding form and is determined that the attended area is a thumb area disposed on a side far from the thumb of the holding hand; and wherein the display control unit enlarges a horizontal width of at least some of objects displayed in a right half portion of the display area when the use form determining unit determines the holding form is the right-hand and determines the attended area is a thumb area disposed on a side close to a thumb of a holding hand or when the holding form is determined to be the left-hand holding form and is determined that the attended area is a thumb area disposed on a side far from the thumb of the holding hand.

4. The display device according to claim 1, wherein the use form determining unit, in a case where a touch position of which a detection range is wider than a predetermined value is present among a plurality of touch positions detected on the end face by the operation detecting member, specifies the touch position as a touch position of a thenar, in a case where a touch position of which a detection range is narrower than a predetermined value is present, specifies the touch position as a touch position of the thumb and any one of four fingers other than the thumb, and determines whether the attended area is a near thumb area disposed on a side close to the thumb of a holding hand or a far thumb area disposed on a side far from the thumb of the holding hand based on a combination of the touch positions of the thumb, the four fingers, and the thenar.

5. A display device comprising:
a display member;
an operation detecting member that is superimposed on the display member;
a casing in which the display member and the operation detecting member are stored;
the operation detecting member detecting a touch operation for a display area of the display member, and a part of the operation detecting member detecting a touch operation for an end face of the casing other than the display area,
a storage member that stores positions of touchable areas in which, for one or more objects included on a screen displayed on the display member, touch operations for the objects can be received;
a use form determining unit that determines a holding form based on the touch position of the touch operation for the end face that is detected by the operation detecting member; and
a touchable area correcting unit that corrects the positions of the touchable areas of the objects stored in the storage member based on the holding form determined by the use form determining unit;
wherein the end face is an outer surface; and
wherein a shortest distance between the operation detecting member and the outer surface is less than or equal to a maximum detectable distance in which the touch operation for the outer surface is detectable by the operation detecting member.

6. The display device according to claim 5, wherein the touchable area correcting unit corrects the positions of the touchable areas of at least some of the objects displayed on the display area to a left side in a case where the holding form is determined to be left-hand holding by the use form determining unit and corrects the positions of the touchable areas of at least some of the objects to a right side in a case where the holding form is determined to be right-hand holding.

7. The display device according to claim 5,
wherein the use form determining unit determines an attended area of the display area that is an area attended for a touch operation by a user in addition to the holding form, and
wherein the touchable area correcting unit corrects the positions of the touchable areas of the objects with a correction target range on the display area, a correction direction, and a degree of the correction being changed based on the holding form and the attended area determined by the use form determining unit.

8. The display device according to claim 7, wherein the touchable area correcting unit corrects the positions of the touchable areas of at least some of the objects displayed in a left half of the display area to a right side by a distance corresponding to a first offset value in a case where it is determined by the use form determining unit that the holding form is left-hand holding, and the attended area is a near thumb area disposed on a side close to a thumb of a holding hand, corrects the positions of the touchable areas of at least some of the objects displayed in a right half of the display area to a left side by a distance corresponding to a second offset value that is less than the first offset value in a case where it is determined by the use form determining unit that the holding form is the left-hand holding, and the attended area is a far thumb area disposed on a side far from the thumb of the holding hand, corrects the positions of the touchable areas of at least some of the objects displayed in the right half of the display area to the left side by a distance corresponding to the first offset value in a case where it is determined by the use form determining unit that the holding form is right-hand holding, and the attended area is the near thumb area, and corrects the positions of the touchable areas of at least some of the objects displayed in the left half of the display area to the right side by a distance corresponding to the second offset value in a case where it is determined by the use form determining unit that the holding form is the right-hand holding, and the attended area is the far thumb area.

9. The display device according to claim 7, wherein the use form determining unit, in a case where a touch position of which a detection range is wider than a predetermined value is present among a plurality of touch positions detected on the end face by the operation detecting member, specifies the touch position as a touch position of a thenar, in a case where a touch position of which a detection range is narrower than a predetermined value is present, specifies the touch position as a touch position of the thumb and any one of four fingers other than the thumb, and determines whether the attended area is a near thumb area disposed on a side close to the thumb of a holding hand or a far thumb area disposed on a side far from the thumb of the holding hand based on a combination of the touch positions of the thumb, the four fingers, and the thenar.

10. A touch-operation processing method executed by a display device including: a display member; an operation detecting member that is superimposed on the display member; and a casing in which the display member and the operation detecting member are stored, the operation detecting member detecting a touch operation for a display area of the display member, and a part of the operation detecting member detecting a touch operation for an end face of the casing other than the display area, the touch-operation processing method comprising:
determining a holding form based on a touch position of the touch operation for the end face, which is detected by the operation detecting member, and determining an attended area of the display area that is an area of the display area attended by a user for the touch operation; and
changing a display mode of a screen to be displayed on the display member based on the holding form and the attended area determined in the determining of a holding form and an attended area;
wherein the end face is an outer surface; and
wherein a shortest distance between the operation detecting member and the outer surface is less than or equal to a maximum detectable distance in which the touch operation for the outer surface is detectable by the operation detecting member.

* * * * *